US011980783B2

(12) United States Patent
Magnone et al.

(10) Patent No.: US 11,980,783 B2
(45) Date of Patent: May 14, 2024

(54) CONTROLLED SYSTEM AND METHODS FOR STORAGE FIRE PROTECTION

(71) Applicant: Tyco Fire Products LP, Lansdale, PA (US)

(72) Inventors: Zachary L. Magnone, Warwick, RI (US); Daniel G. Farley, Westminster, MA (US); John Desrosier, East Greenwich, RI (US); Donald D. Brighenti, Westminster, MA (US); Richard P. Bonneau, Templeton, MA (US)

(73) Assignee: Tyco Fire Products LP, Cranston, RI (US)

(*) Notice: Subject to any disclaimer, the term of this patent is extended or adjusted under 35 U.S.C. 154(b) by 317 days.

(21) Appl. No.: 17/327,913

(22) Filed: May 24, 2021

(65) Prior Publication Data

US 2021/0275844 A1 Sep. 9, 2021

Related U.S. Application Data

(63) Continuation of application No. 16/352,426, filed on Mar. 13, 2019, now Pat. No. 11,033,764, which is a continuation of application No. 15/107,049, filed as application No. PCT/US2014/072246 on Dec. 23, 2014, now abandoned.

(60) Provisional application No. 62/009,778, filed on Jun. 9, 2014, provisional application No. 61/920,274, filed on Dec. 23, 2013, provisional application No. 61/920,314, filed on Dec. 23, 2013.

(51) Int. Cl.
*A62C 3/00* (2006.01)
*A62C 37/40* (2006.01)

(52) U.S. Cl.
CPC .............. *A62C 3/002* (2013.01); *A62C 37/40* (2013.01)

(58) Field of Classification Search
CPC ......... A62C 3/002; A62C 35/60; A62C 37/10; A62C 37/40; A62C 37/46; A62C 99/0072; A62C 37/04; G08B 17/00; H01B 7/0045
See application file for complete search history.

(56) References Cited

U.S. PATENT DOCUMENTS

| | | | |
|---|---|---|---|
| 3,834,463 | A | 9/1974 | Allard et al. |
| 3,863,720 | A | 2/1975 | Young |
| 4,281,718 | A | 8/1981 | Claussen et al. |
| 5,236,049 | A | 8/1993 | Asselin et al. |

(Continued)

FOREIGN PATENT DOCUMENTS

| | | |
|---|---|---|
| CN | 1347330 | 5/2002 |
| CN | 1987943 A | 6/2007 |

(Continued)

OTHER PUBLICATIONS

International Search Report and Written Opinion for International Application No. PCT/US2015/034951, dated Nov. 6, 2015, 17 pages.

*Primary Examiner* — Qingzhang Zhou
*Assistant Examiner* — Joel Zhou
(74) *Attorney, Agent, or Firm* — Foley & Lardner LLP

(57) ABSTRACT

Fire protection systems and methods for ceiling-only high-piled storage protection. The systems and methods include a fluid distribution, detection and control sub-systems to identify one or more fluid distribution devices for controlled operation to address a fire.

18 Claims, 13 Drawing Sheets

(56) References Cited

U.S. PATENT DOCUMENTS

| | | | | |
|---|---|---|---|---|
| 6,039,124 | A | 3/2000 | Bowman et al. | |
| 6,685,104 | B1 | 2/2004 | Float et al. | |
| 2002/0036090 | A1 | 3/2002 | Gil | |
| 2006/0289174 | A1 | 12/2006 | Yu | |
| 2011/0036598 | A1* | 2/2011 | Pahila | A62C 3/002 169/37 |
| 2011/0168416 | A1 | 7/2011 | Frasure et al. | |
| 2012/0118591 | A1 | 5/2012 | Yen | |
| 2015/0027739 | A1* | 1/2015 | Multer | A62C 3/002 169/37 |
| 2017/0120090 | A1 | 5/2017 | Magnone et al. | |

FOREIGN PATENT DOCUMENTS

| | | | |
|---|---|---|---|
| CN | 202028072 | U | 11/2011 |
| DE | 19945856 | | 4/2001 |
| EP | 1 171 206 | A1 | 3/2005 |
| EP | 1 171 206 | B1 | 3/2005 |
| EP | 2 343 105 | A2 | 7/2011 |
| EP | 2 371 425 | | 10/2011 |
| EP | 3 151 928 | B1 | 5/2020 |
| GB | 2 146 243 | A | 4/1985 |
| JP | 50-100898 | | 8/1975 |
| JP | 54-117198 | | 9/1979 |
| JP | 60-174161 | | 9/1985 |
| JP | 09-276426 | | 10/1997 |
| JP | 2005-168645 | | 6/2005 |
| JP | 2009-516533 | | 4/2009 |
| KR | 10-2001-0082794 | | 8/2001 |
| KR | 10-1258018 | B1 | 4/2013 |
| KR | 10-1329156 | B1 | 11/2013 |
| WO | WO-2014/076348 | A1 | 5/2014 |

* cited by examiner

CONTROLLED SYSTEM AND METHODS FOR STORAGE FIRE PROTECTION

PRIORITY DATA & INCORPORATION BY REFERENCE

This application is a continuation of U.S. patent application Ser. No. 16/352,426, filed Mar. 13, 2019, which is a continuation of U.S. patent application Ser. No. 15/107,049, filed Jun. 21, 2016, which is a National Stage Application of International Application No. PCT/US2014/072246, filed Dec. 23, 2014, which claims the benefit of priority to U.S. Provisional Application Nos. 61/920,274, filed Dec. 23, 2013; 61/920,314, filed Dec. 23, 2013; and U.S. Provisional Application No. 62/009,778, filed Jun. 9, 2014, each of which is incorporated by reference in its entirety.

TECHNICAL FIELD

The present invention relates generally to fire protection systems for storage. More specifically, the present invention involves fire protection systems to generate a controlled response to a fire in which a fixed volumetric flow of firefighting fluid is distributed to effectively quench a fire.

BACKGROUND OF THE INVENTION

Industry accepted system installation standards and definitions for storage protection are provided in National Fire Protection Association publication, *NFPA* 13: *Standard for the Installation of Sprinkler Systems* (2013 ed.) ("NFPA 13"), With regard to the protection of stored plastics, such as for example Group A plastics, NFPA 13 limits the manner in which the commodity can be stored and protected. In particular, Group A plastics including expanded exposed and unexposed plastics is limited to palletized, solid-piled, bin box, shelf or back-to-back shelf storage up to a maximum height of twenty-five feet beneath a maximum thirty foot ceiling depending upon the particular plastic commodity. NFPA 13 does provide for rack storage of plastic commodities, but limits rack storage of Group A plastics to (i) cartoned, expanded or nonexpanded and (ii) exposed, nonexpanded plastics. Moreover, the rack storage of the applicable Group A plastics is limited to a maximum storage height of forty feet (40 ft.) beneath a maximum ceiling of forty-five feet (45 ft.). Under the installation standards, the protection of Group A plastics in racks requires particular accommodations such as for example, horizontal barriers and/or in-rack sprinklers. Accordingly, the current installation standards do not provide for fire protection of exposed, expanded plastics in a rack storage arrangement with or without particular accommodations, e.g., a "ceiling-only" fire protection system. Generally, the systems installed under the installation standards provide for fire "control" or "suppression." The industry accepted definition of "fire suppression" for storage protection is sharply reducing the heat release rate of a fire and preventing its regrowth by means of direct and sufficient application of a flow of water through the fire plume to the burning fuel surface. The industry accepted definition of "fire control" is defined as limiting the size of a fire by distribution of a flow of water so as to decrease the heat release rate and pre-wet adjacent combustibles, while controlling ceiling gas temperatures to avoid structural damage. More generally, "control" according to NFPA 13, can be defined "as holding the fire in check through the extinguishing system or until the fire is extinguished by the extinguishing system or manual aid."

Dry system ceiling-only fire protection systems for rack storage including Group A plastics shown and described in U.S. Pat. No. 8,714,274. These described systems address a fire in a rack storage occupancy by delaying the discharge of firefighting fluid from actuated sprinklers to "surround and drown" the fire. Each of the systems under either NFPA or described in U.S. Pat. No. 8,714,274, employ "automatic sprinklers" which can be either a fire suppression or fire control device that operates automatically when its heat-activated element is heated to its thermal rating or above, allowing water to discharge over a specified area upon delivery of the firefighting fluid. Accordingly, theses known systems employs sprinklers that are actuated in a thermal response to the fire.

In contrast to systems that use a purely thermally automatic response, there are described systems that use a controller to operate one or more sprinkler devices. For example, in Russian Patent No. RU 95528 a system is described in which the system is controlled to open a fixed geographical area of sprinkler it irrigators that is larger than the area of a detected fire. In another example, Russian Patent No. RU 2414966, a system is described which provides for controlled operation of sprinkler irrigators of a fixed zone closer to the center of the fire, but the operation of the zone is believed to rely in part upon visual detection by persons able to remotely operate the sprinkler irrigators. These described systems are not believed to improve upon known methods of addressing the fire nor is it believed that the described system provide fire protection of high challenge commodities and in particular plastic commodities.

DISCLOSURE OF INVENTION

Preferred systems and methods are provided which improve fire protection over systems and methods that address a fire with a control, suppression and/or surround and drown effect. Moreover, the preferred systems and methods described herein provide for protection of storage occupancies and commodities with "ceiling-only" fire protection. As used herein, "ceiling-only" fire protection is defined as fire protection in which the fire protection devices, i.e., fluid distribution devices and/or detectors, are located at the ceiling, above the stored items or materials such that there are no fire protection devices between the ceiling devices and the floors. The preferred systems and methods described includes means for quenching a fire for the protection of a storage commodity and/or occupancy. As used herein, "quench" or "quenching" of a fire is defined as providing a flow of firefighting liquid, preferably water, to substantially extinguish a fire to limit the impact of a fire on a storage commodity; and in a preferred manner, provide a reduced impact as compared to known suppression performance sprinkler systems. Additionally or alternatively to quenching the fire, the systems and methods described herein can also effectively address the fire with fire control, fire suppression and/or surround and drown performance or provide fire protection systems and methods for stored commodities that are unavailable under current installation designs, standards or other described methods. Generally, the preferred means for quenching includes a piping system, a plurality of fire detectors to detect a fire and a controller in communication with each of the detectors and fluid distribution devices to identify a select number of fluid distribution devices preferably defining an initial discharge array above and about the detected fire. The preferred means provides for controlled operation of the fluid distribution devices of the discharge array to distribute a preferably fixed and minimized flow of firefighting fluid to preferably quench the fire. In some embodiments, the preferred means controls the supply of firefighting fluid to the selected fluid distribution devices.

In particular preferred embodiments of the systems and methodologies described herein, the inventors have determined an application of a preferred embodiment of the quenching means to provide for protection of exposed expanded plastics in racks. In particular, the preferred means for quenching can provide for ceiling-only fire protection of rack storage of exposed expanded plastics without accommodations required under current installation standards, e.g., in-rack sprinklers, barriers, etc, and at heights not provided for under the standards. Moreover, it is believed that the preferred means for quenching can effectively address a high challenge fire in a test fire without the need for testing accommodations, such as for example, vertical barriers that limit the lateral progression of a fire in the test array.

Preferred embodiments of the fire protection systems for storage protection described herein provide for a controlled response to a fire by providing a fixed volumetric flow of firefighting fluid at a threshold moment in the fire to limit and more preferably reduce impact of the fire on a storage commodity. A preferred embodiment of a fire protection system is provided for protection of a storage occupancy having a ceiling defining a nominal ceiling height greater than thirty feet. The system preferably includes a plurality of fluid distribution devices disposed beneath the ceiling and above a storage commodity in the storage occupancy having a nominal storage height ranging from a nominal 20 ft. to a maximum nominal storage height of 55 ft. and means for quenching a fire in the storage commodity. Preferred means for quenching include a fluid distribution system including a network of pipes interconnecting the fluid distribution devices to a water supply; a plurality of detectors to monitor the occupancy for the fire; and a controller coupled to the plurality of detectors to detect and locate the fire, the controller being coupled to the plurality of distribution devices to identify and control operation of a select number of fluid distribution devices and more preferably four fluid distribution devices above and about the fire.

One preferred embodiment of the controller includes an input component coupled to each of the plurality of detectors for receipt of an input signal from each of the detectors, a processing component for determining a threshold moment in growth of the fire; and an output component to generate an output signal for operation of each of the identified fluid distribution devices in response to the threshold moment. More particularly, preferred embodiments of the controller provide that the processing component analyzes the detection signals to locate the fire and select the proper fluid distribution devices to preferably define a discharge array above and about the fire for operation. Preferred embodiments of the fluid distribution device can include an open frame body and an electrically operated solenoid valve to control the flow of water to the sprinkler. Other preferred embodiments of the fluid distribution device can include a sprinkler frame body and an electrically responsive actuator arranged with the sprinkler frame body to control the flow of water from the frame body. Accordingly, a preferred fluid distribution device includes a sealing assembly and a transducer responsive to an electrical signal to operate the transducer. One particular embodiment of the fluid distribution devices includes an ESFR sprinkler frame body and deflector having a nominal K-factor of 25.2 $GPM/PSI^{1/2}$.

The preferred systems can be installed beneath a nominal ceiling height of 45 feet and above a nominal storage height of 40 feet. The preferred system can alternatively be installed beneath a nominal ceiling height of 30 feet and above a nominal storage height of 25 feet. The stored commodity can be arranged as any one of rack, multi-rack and double-row rack, on floor, rack without solid shelves, palletized, bin box, shelf, or rack storage. Moreover, the stored commodity can be any one of Class I, II, III or IV, Group A, Group B, or Group C plastics, elastomers, or rubber commodities. In one preferred embodiment for the protection of rack storage, the commodity is expanded exposed plastics.

In another preferred aspect, a method of fire protection of a storage occupancy is provided. The preferred method includes detecting a fire in a storage commodity in the storage occupancy and quenching the fire in the storage commodity. The preferred method includes determining a select plurality of fluid distribution devices to define a discharge array above and about the fire. The fluid distribution devices can be determined dynamically or may be a fixed determination. The determination preferably includes identifying preferably any one of four, eight or nine adjacent fluid distribution devices above and about the fire. The preferred method further includes identifying a threshold moment in the fire to operate the identified fluid distribution devices substantially simultaneously.

A preferred method of detecting the fire includes continuously monitoring the storage occupancy and defining a profile of the five and/or locating the origin of the fire. Preferred embodiments of locating the fire includes defining an area of fire growth based upon data readings from a plurality of detectors that are monitoring the occupancy; determining a number of detectors in the area of fire growth; and determining the detector with the highest reading. Preferred methods of quenching includes determining a number of discharge devices proximate the detector with the highest reading, and more preferably determining the four discharge devices about the detector with the highest reading. A preferred embodiment of the method includes determining a threshold moment in the fire growth to determine when to operate the discharge devices; and quenching includes operating the preferred discharge array with a controlled signal.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
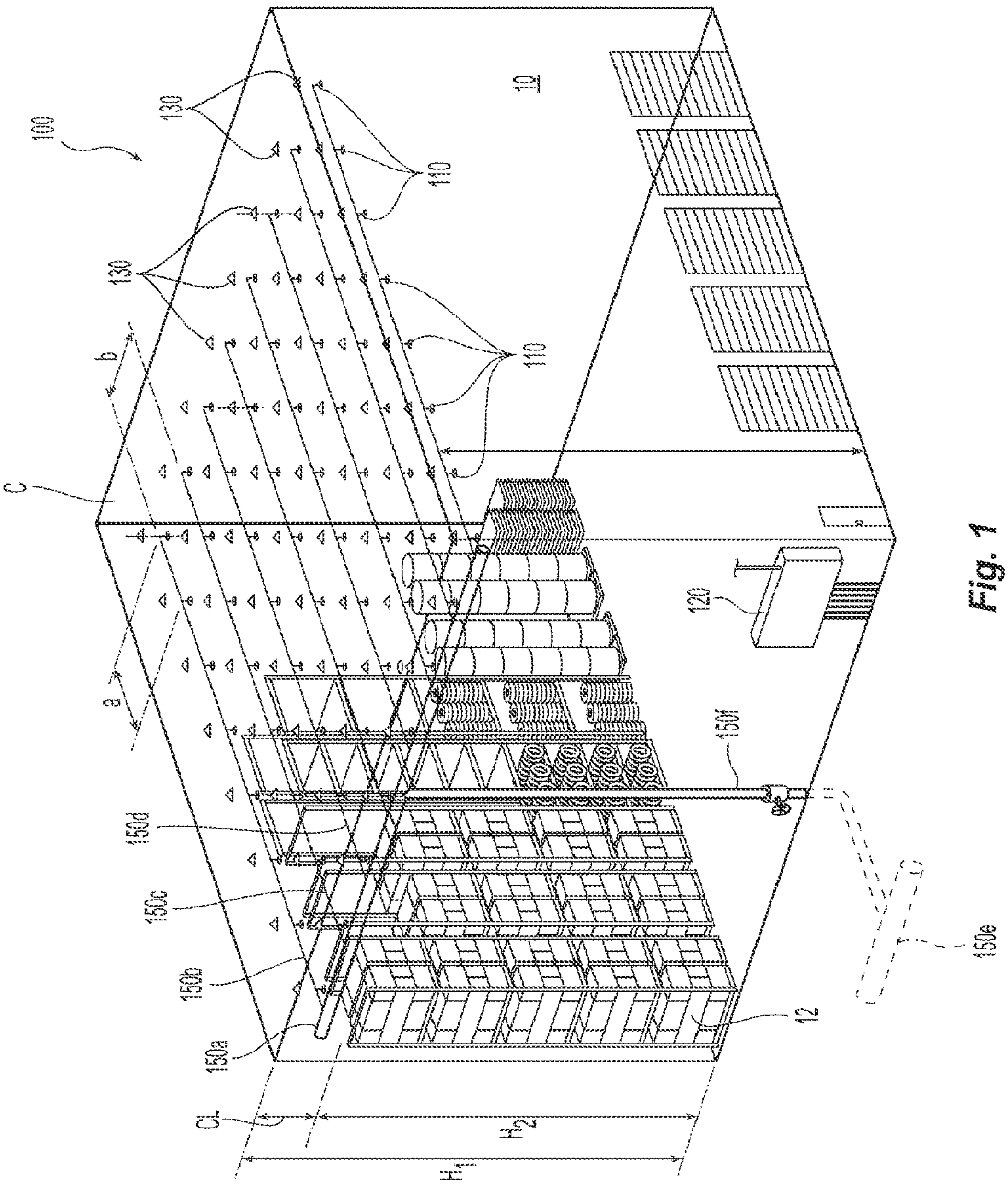
FIG. 1 is a representative illustration of one embodiment of the preferred fire protection system for storage.
Figure 2:
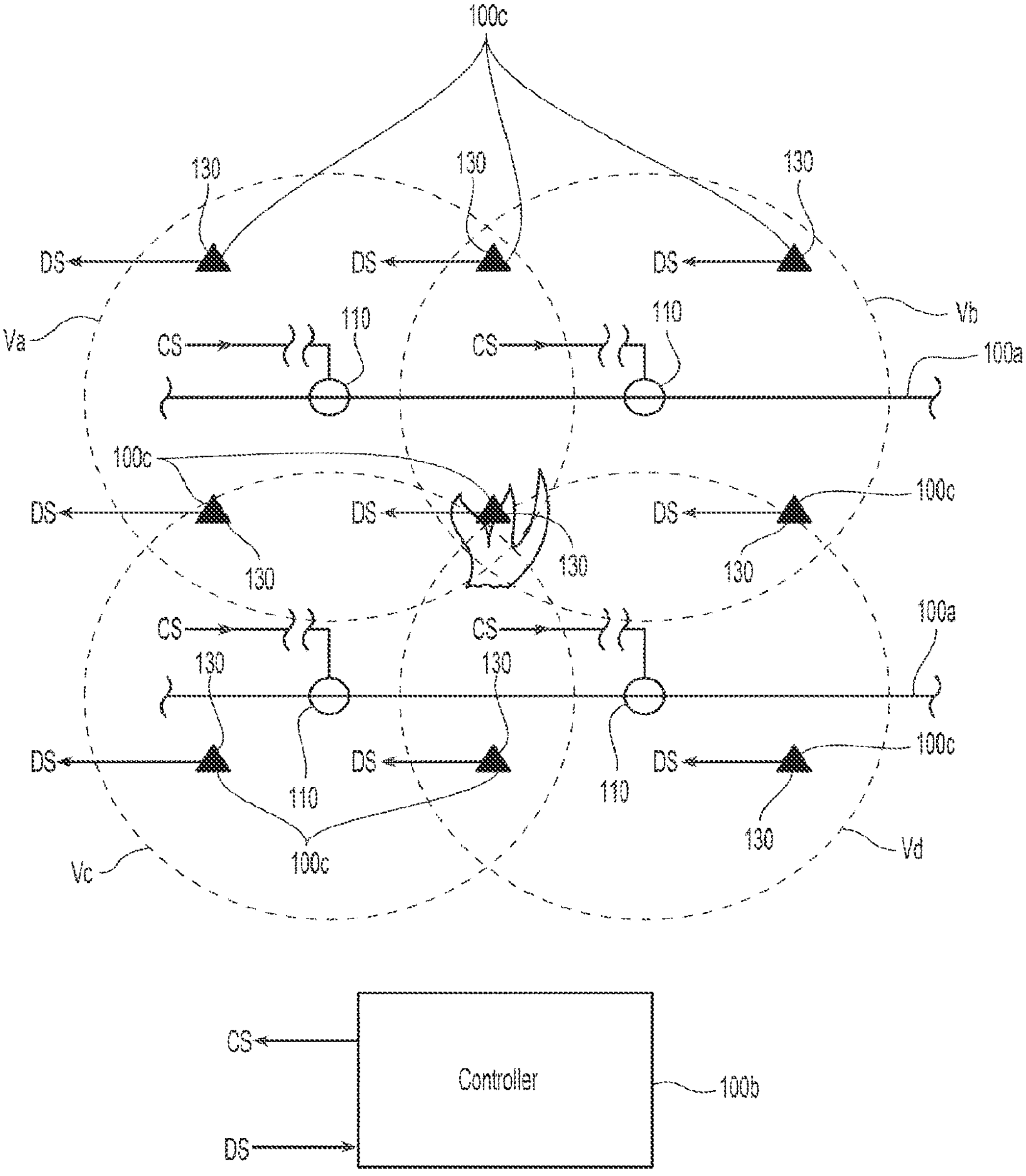
FIG. 2 is a schematic illustration of operation of the preferred system of FIG. 1.

Shown in FIGS. 1 and 2 is a preferred embodiment of a fire protection system 100 for the protection of the storage occupancy 10 and one or more stored commodities 12. The preferred systems and methods described herein utilize two principles for fire protection of the storage occupancy: (i) detection and location of a fire; and (ii) responding to the fire at a threshold moment with a controlled discharge and distribution of a preferably fixed minimized volumetric flow of firefighting fluid, such as water, over the fire to effectively address and more preferably quench the fire. Moreover, the preferred systems and methods include fluid distribution devices coupled to a preferred means to address and more preferably quench a fire.

The preferred system shown and described herein includes means for quenching a fire having a fluid distribution sub-system 100*a*, a control sub-system 100*b* and a detection sub-system 100*c*. With reference to FIG. 2, the fluid distribution and control sub-systems 100*a* 100*b* work together, preferably by communication of one or more control signals CS, for controlled operation of selectively identified fluid distribution devices 110 defining a preferred discharge array to deliver and distribute the preferred fixed volumetric flow V of firefighting fluid preferably substantially above and about the site of a detected fire F in order to effectively address and more preferably quench the fire. The fixed volumetric flow V can be defined by a collection of distributed discharges Va, Vb, Vc, and Vd. The detection sub-system 100*c* with the control sub-system 100*b* determines, directly or indirectly, (i) the location and magnitude of a fire F in the storage occupancy 10; and (ii) selectively identifies the fluid distribution devices 110 for controlled operation in a preferred manner as described herein. The detection and control sub-systems 100*b*, 100*c* work together, preferably by communication of one or more detection signals DS, to detect and locate the fire F. As shown in FIG. 1, the fluid distribution devices are located for distribution of the firefighting fluid from a preferred position beneath the ceiling of the storage occupancy and above the commodity to provide for "ceiling-only" fire protection of the commodity. The detection sub-system 100*c* preferably includes a plurality of detectors 130 disposed beneath the ceiling and above the commodity in support of the preferably ceiling-only fire protection system. The control sub-system 100*b* preferably includes one or more controllers 120 and more preferably a centralized controller 120 coupled to the detectors 130 and fluid distribution devices 110 for the controlled operation of the selectively identified group of devices 110.

Figure 2A:
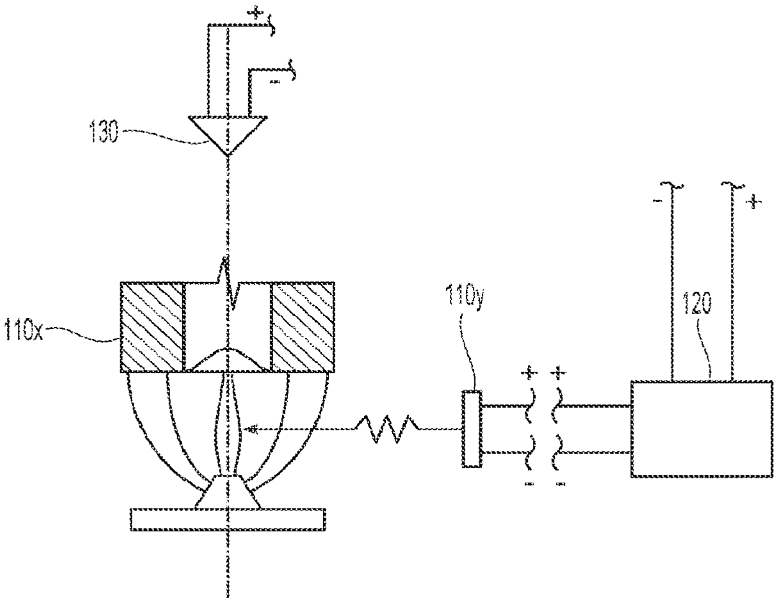
FIGS. 2A-2B are schematic illustrations of preferred fluid distribution devices arrangements for use in the preferred system of FIG. 1.
Figure 2B:
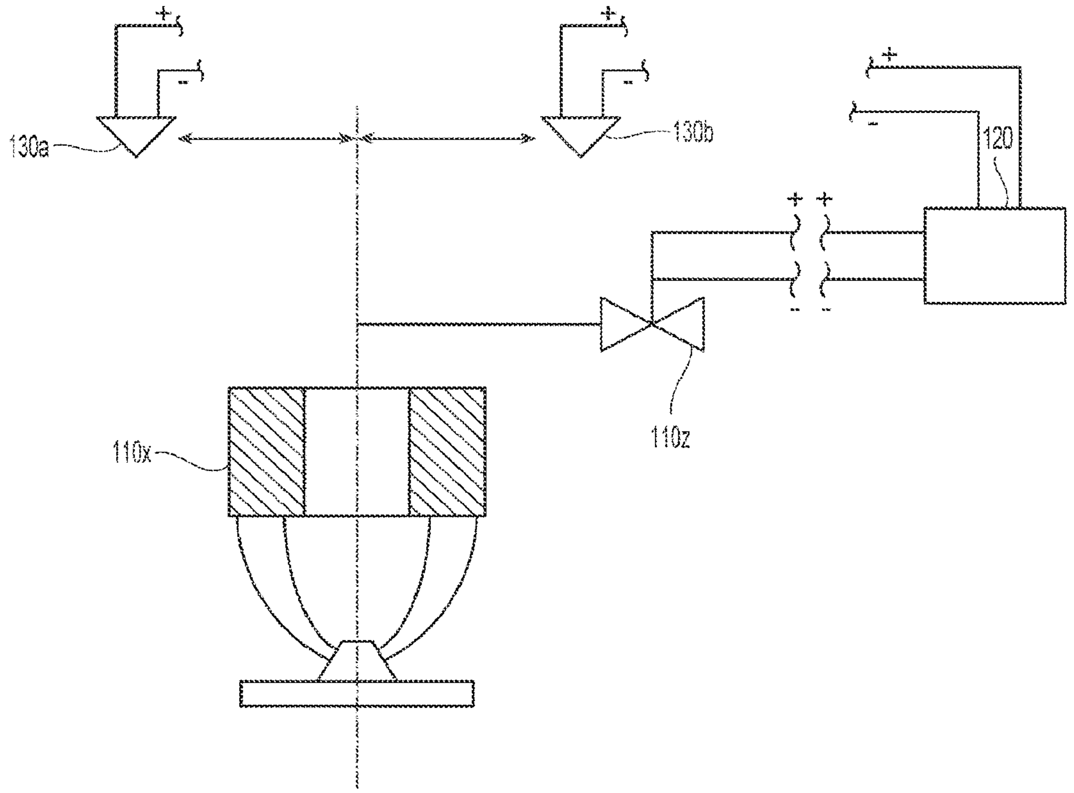

The detectors 130 of the detector sub-system 100*c* monitor the occupancy to detect changes for any one of temperature, thermal energy, spectral energy, smoke or any other parameter to indicate the presence of a fire in the occupancy. The detectors 130 can be any one or combination of thermocouples, thermistors, infrared detectors, smoke detectors and equivalents thereof. Known detectors for use in the system include TrueAlarm® Analog Sensing analog sensors from SIMPLEX, TYCO FIRE PROTECTION PRODUCTS. In the preferred embodiments of the ceiling-only system 100, as seen for example in FIG. 1 the one or more detectors 130 for monitoring of the storage occupancy 10 are preferably disposed proximate the fluid distribution device 110 and more preferably disposed below and proximate to the ceiling C. The detectors 130 can be mounted axially aligned with the sprinkler 110, as schematically shown in FIG. 2A or may alternatively be above and off-set from the distribution device 110, as schematically shown in FIGS. 2 and 2B. Moreover, the detectors 130 can be located at the same or any differential elevation from the fluid distribution device 110 provided the detectors 130 are located above the commodity to support the ceiling-only protection. The detectors 130 are coupled to the controller 120 to communicate detection data or signals to the controller 120 of the system 100 for processing as described herein. The ability of the detectors 130 to monitor environmental changes indicative of a fire can depend upon the type of detector being used, the sensitivity of the detector, coverage area of the detector, and/or the distance between the detector and the fire origin. Accordingly, the detectors 130 individually and collectively are appropriately mounted, spaced and/or oriented to monitor the occupancy 10 for the conditions of a fire in a manner described.

Figure 3:
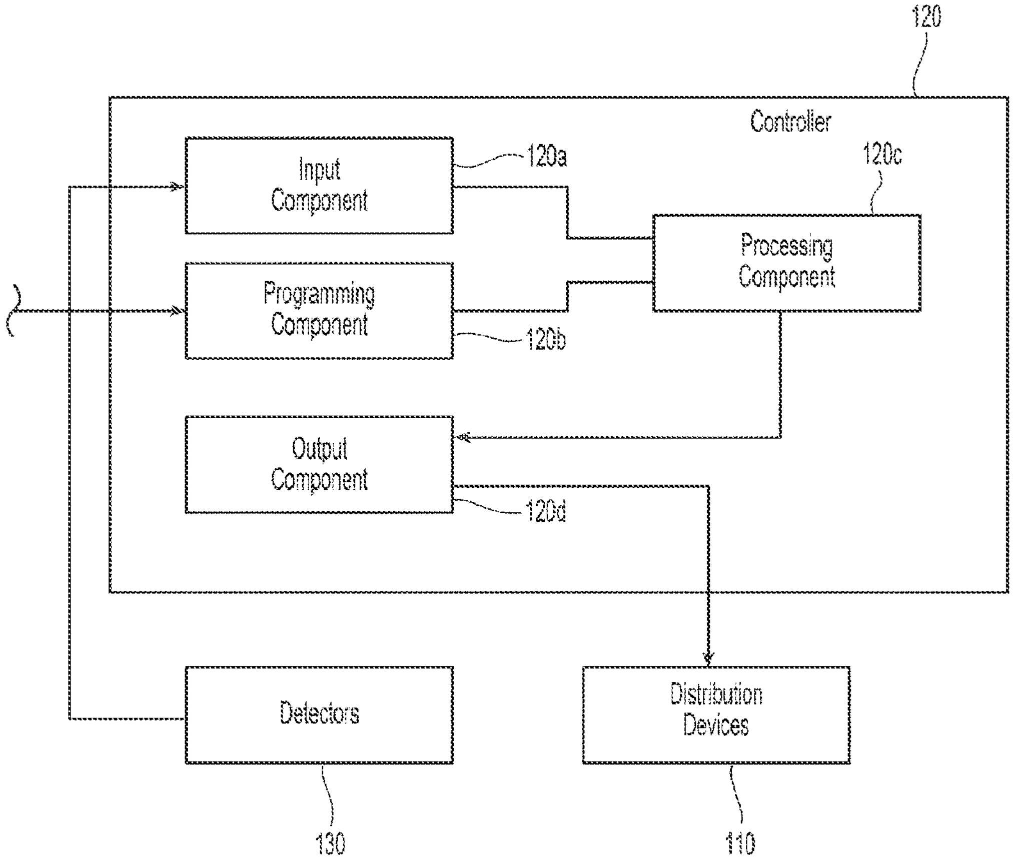
FIG. 3 is a schematic illustration of a controller arrangement for use in the system of FIG. 1.

The preferred centralized controller 120 is shown schematically in FIG. 3 for receiving, processing and generating the various input and output signals from and/or to each of the detectors 130 and fluid distribution devices 110. Functionally, the preferred controller 120 includes a data input component 120*a*, a programming component 120*b*, a processing component 120*c* and an output component 120*d*. The data input component 120*a* receives detection data or signals from the detectors 130 including, for example, either raw detector data or calibrated data, such as for example, any one of continuous or intermittent temperature data, spectral energy data, smoke data or the raw electrical signals representing such parameters, e.g., voltage, current or digital signal, that would indicate a measured environmental parameter of the occupancy. Additional data parameters collected from the detectors 130 can include time data, address or location data of the detector. The preferred programming component 120*b* provides for input of user-defined parameters, criteria or rules that can define detection of a fire, the location of the fire, the profile of the fire, the magnitude of the fire and/or a threshold moment in the fire growth. Moreover, the programming component 120*b* can provide for input of select or user-defined parameters, criteria or rules to identify fluid distribution devices or assemblies 110 for operation in response to the detected fire, including one or more of the following:, defining relations between distribution devices 110, e.g., proximity, adjacency, etc., define limits on the number of devices to be operated, i.e., maximum and minimums, the time of operation, the sequence of operation, pattern or geometry of devices for operation, their rate of discharge; and/or defining associations or relations to detectors 130. As provided in the preferred control methodologies described herein, detectors 130 can be associated with a fluid distribution devices 110 on a one-to-one basis or alternatively can be associated with more than one fluid distribution device. Additionally, the input and/or programming components 120*a*, 120*b* can provide for feedback or addressing between the fluid distribution devices 110 and the controller 120 for carrying out the methodologies of the distribution devices in a manner described herein.

Accordingly, the preferred processing controller 120*c* processes the input and parameters from the input and programming components 120*a*, 120*b* to detect and locate a fire, and select, prioritize and/or identify the fluid distribution devices for controlled operation in a preferred manner. For example, the preferred processing controller 120*c* generally determines when a threshold moment is achieved; and with the output component 120*d* of the controller 120 generates appropriate signals to control operation of the identified and preferably addressable distribution devices 110 preferably in accordance with one or more methodologies described herein. A known exemplary controller for use in the system 100 is the Simplex® 4100 Fire Control Panel from TYCO FIRE PROTECTION PRODUCTS. The programming may be hard wired or logically programmed and the signals between system components can be one or more of analog, digital, or fiber optic data. Moreover communication between components of the system 100 can be any one or more of wired or wireless communication.

Figure 4:
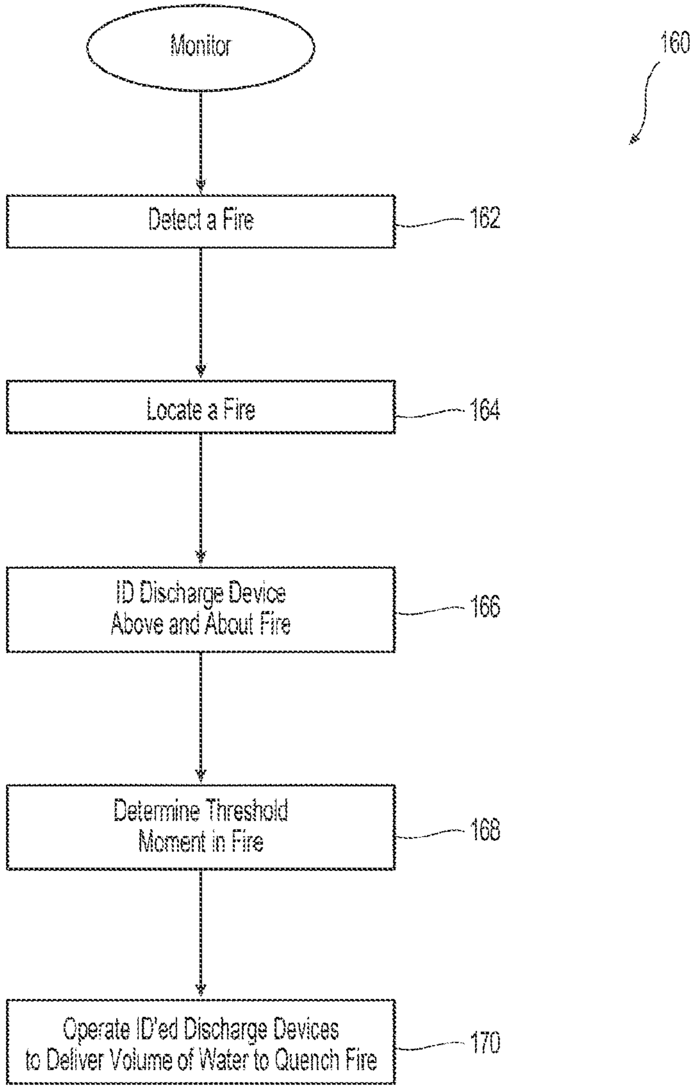
FIG. 4 is a preferred embodiment of controller operation of the system of FIG. 1.

Shown in FIG. 4 is a preferred generalized embodiment of operation 160 of the controller 120 in the system 100. In an operative state of the system, the processing component 120*c* processes the input data to detect 162 and locate 164 a fire F. In accordance with the preferred methodologies herein, the processing component 120*c*, based upon the detection and/or other input data or signals from the detection sub-system 100*c*, identifies 166 the fluid distribution devices 110 which define a preferred array above and about the located fire F for controlled discharge. The processing component 120*c* preferably determines a threshold moment 168 in the fire for operation and discharge from the selected array of fluid distribution devices. In step 170, the processing component 120*c* with the output component 120*d* appropriately signals to operate 170 the identified fluid distribution devices for addressing and more preferably quenching the fire.

The discharge array is preferably initially defined by a select and prioritized number of fluid distribution devices 110 and a geometry that is preferably centered above the detected fire. As described herein, the number of discharge devices 110 in the discharge array can be pre-programmed or user-defined and is more preferably limited up to a pre-programmed or user-defined maximum number of devices forming the array. Moreover, the select or user-defined number of discharge devices can be based upon on one or more factors of the system 100 and/or the commodity being protected, such as for example, the type of distribution device 110 of the system 100, their installation configuration including spacing and hydraulic requirements, the type and/or sensitivity of the detectors 130, the type or category of hazard of the commodity being protected, storage arrangement, storage height and/or the maximum height of the ceiling of the storage occupancy. For example, for more hazardous commodities such as Group A exposed expanded plastics stored beneath a rectilinear grid of distribution devices, a preferred number of fluid distribution devices forming the discharge array can preferably be eight (a 3×3 square perimeter of eight devices) or more preferably can be nine (a 3×3 grid array of devices). In another example, for Group A cartoned unexpanded plastics, a preferred number of discharge devices can be four (a 4×4 grid array of devices) as schematically shown in FIG. 2. Alternatively, for less hazardous commodities, the number of discharge devices of the array can be one, two or three substantially centered above and about the fire F. Again, the particularized number of devices in the discharge array can be defined or dependent upon the various factors of the system and the commodity being protected. The resulting discharge array preferably delivers and distributes the fixed volumetric flow V of firefighting fluid preferably substantially above and about the site of a detected fire F in order to effectively address and more preferably quench the fire.

The identification of the fluid distribution devices 110 for the discharge array and/or the shape of the array can be determined dynamically or alternatively may be of a fixed determination. As used herein, the "dynamic determination-"means that the selection and identification of the particular distribution devices 110 to form the discharge array is determined preferably over a period of time as a function of the detector readings from the moment of a defined first detection of a fire up to a defined threshold moment in the fire. In contrast, in a "fixed" determination, the number of distribution devices of the discharge array and its geometry is predetermined; and the center or location of the array is preferably determined after a particular level of detection or other threshold moment. The following preferred controller operations for identification and operation of the discharge array are illustrative of the dynamic and fixed determinations.

Figure 4A:
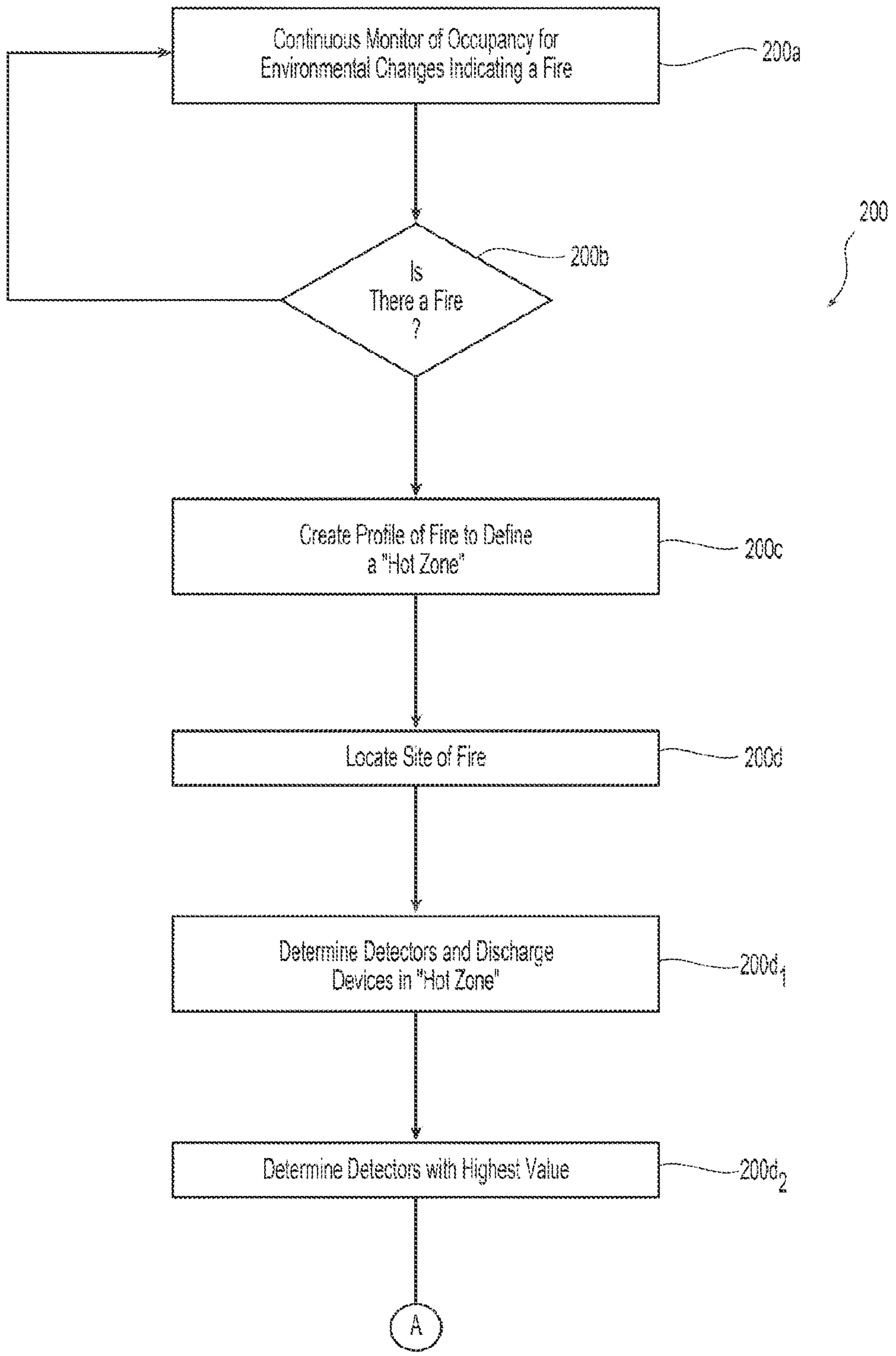
FIGS. 4A and 4B is another preferred embodiment of controller operation of the system of FIG. 1.
Figure 4B:
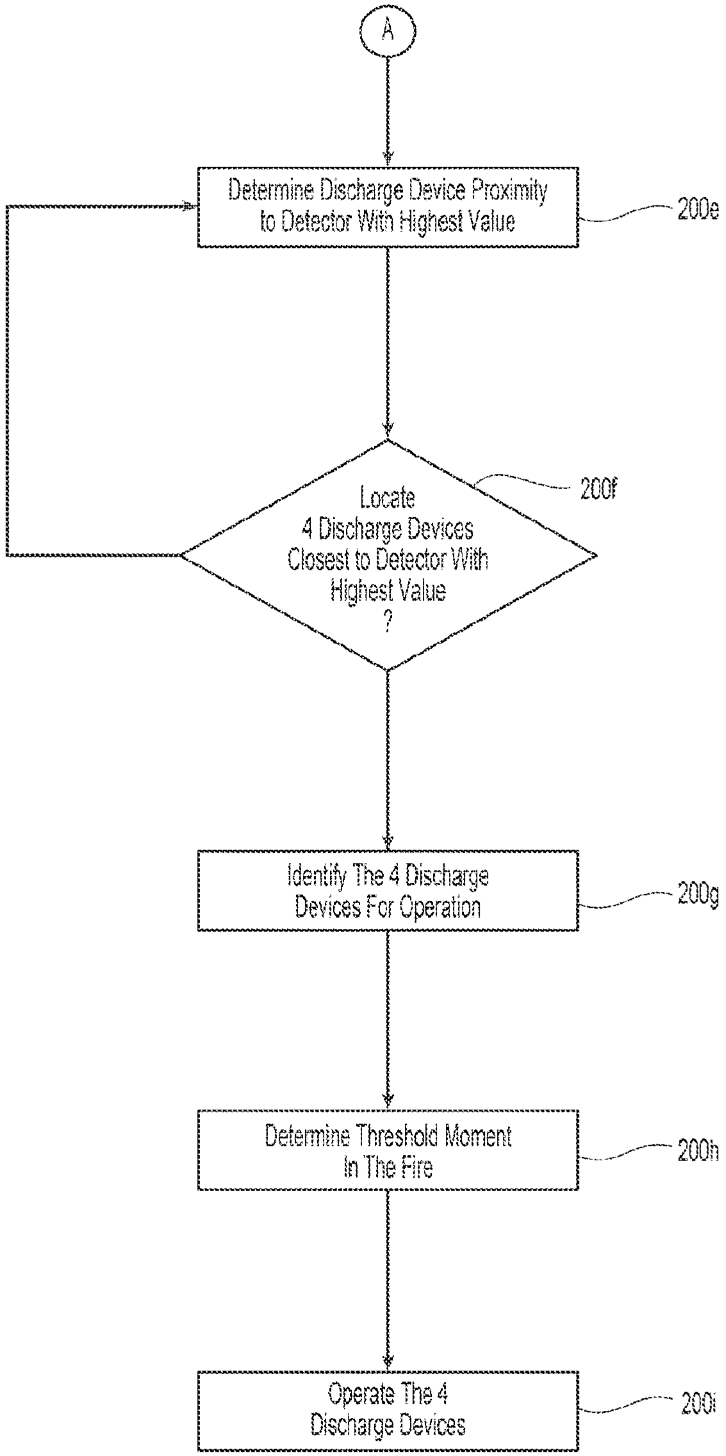

Shown in FIG. 4A and FIG. 4B, is a flowchart of another exemplary preferred operational embodiment 200 of the controller 120 of the system 100. In a first step 200*a*, the controller 120 continuously monitors the environment of the occupancy based upon sensed or detected input from the detectors 130. The controller 120 processes the data to determine the presence of a fire F in step 200*b*. The indication of a fire can be based on sudden change in the sensed data from the detectors 130, such as for example, a sudden increase in temperature, spectral energy or other measured parameters. If the controller 120 determines the presence of a fire, the controller 120 develops a profile of the fire in step 200*c* and more preferably defines a "hot zone" or area of fire growth based on incoming detection data. With the preferred profile or "hot zone" established, the controller 120 then locates the origin or situs of the fire in step 200*d*. In one particular embodiment, the preferred controller 120 determines in step 200*d*1. all the detectors 130 and distribution devices 110 within the fire profile or "hot zone." The controller 120 in a next step 200*d*2 determines the detector 130 or distribution device 110 closest to the fire. In one preferred aspect, this determination can be based upon identification of the detector 130 measuring the highest measured value within the hot zone. The controller 120 can preferably determine in step 200*e* the proximity of fluid distribution devices 110 relative to the detector 130 with the highest value.

The controller 120 further preferably identifies the fluid distribution devices 110 above, about and more preferably closest to the fire to define the preferred discharge array. For example, the controller 120 preferably dynamically and iteratively identifies step 200*f* the closest four discharge devices 110 about the detection device with the highest measured value or other selection criteria. Alternatively, the controller 120 can select and identify distribution devices 110 any other preferably user-defined number of devices such as, for example, eight or nine distribution devices based on the selection criteria. The closest four distribution devices 110 about and above the fire are then identified for operation in step 200*g*. In step 200*h*, the controller 120 preferably determines a threshold moment at which to operate the four distribution devices 110 above and about the fire. The controller 120 can be preferably programmed with a user-defined threshold value, moment or criteria in terms of temperature, heat release rate, rate of rise in temperature or other detected parameter. The threshold moment can be determined from any one or combination of system parameters, for example, the number of detectors having data readings above a user-defined threshold value, the number of fluid distribution devices in the "hot zone" reaching a user-define amount, the temperature profile reaching threshold level, the temperature profile reaching a user-specified slope over time, the spectral energy reaching a user-defined threshold level; and/or the smoke detectors reaching a user-defined particulate level. Once the threshold moment is reached, the controller 120 signals the four distribution devices 110 for operation in step 200*i*. More preferably, the controller 120 operates the select four distribution devices 110 of the discharge array substantially simultaneously to address and more preferably quench the fire.

Figure 5A:
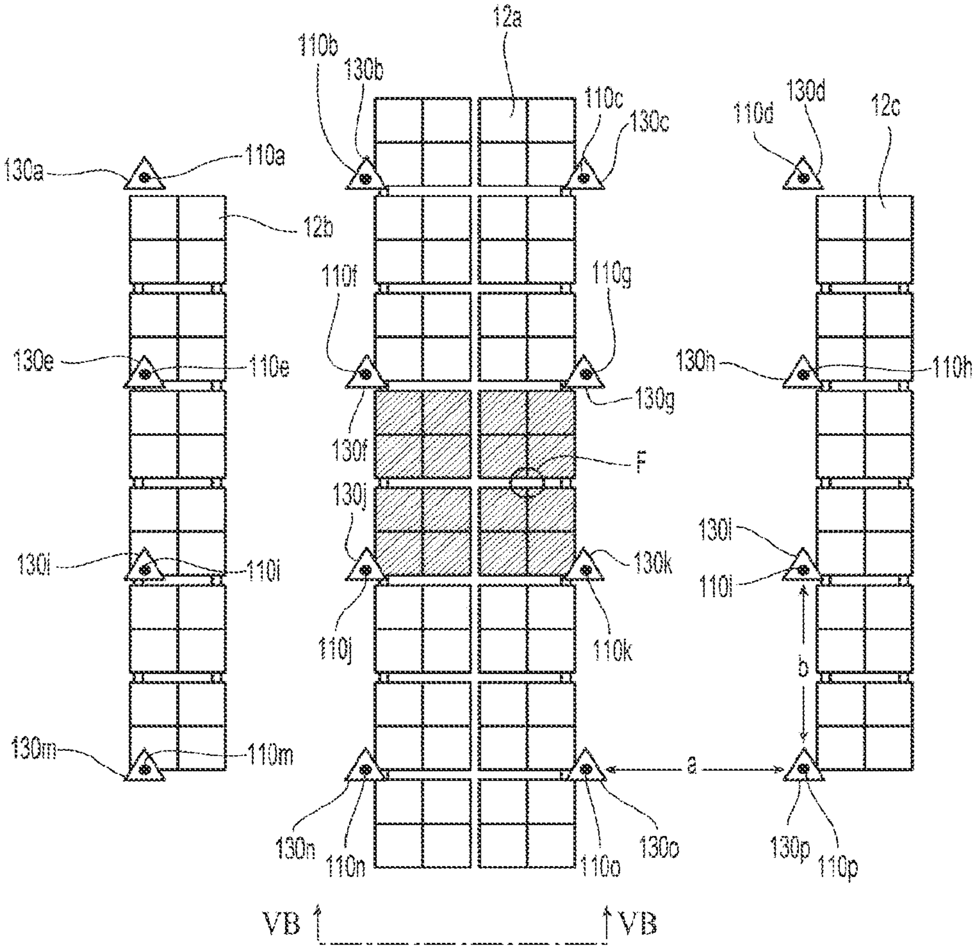
FIGS. 5A and 5B are schematic illustrations of a preferred installation of the system of FIG. 1.

Shown in FIG. 5A is a plan view of the preferred ceiling-only system 100 disposed above a stored commodity in a rack arrangement. Shown in particular is an exemplary grid of the fluid distribution devices 110*a*-110*p* and detectors 130*a*-130*p*. In an example of the methodology 200, the detectors 130 detect a fire and the processor 120 determine the location of the fire F. Where, for example, the detector 130*g* is identified as detector, with the highest reading, the fluid distribution devices 110*f,* 110*g*, 110*j*, 110*k* are identified by the controller 120 as being above and about the fire F in the "hot zone". The controller 120 operates the fluid distribution devices 110*f,* 110*a* 110*j*, 110*k* to address the fire upon the detectors within the "hot zone" meeting or exceeding the user-defined threshold.

Figure 4C:
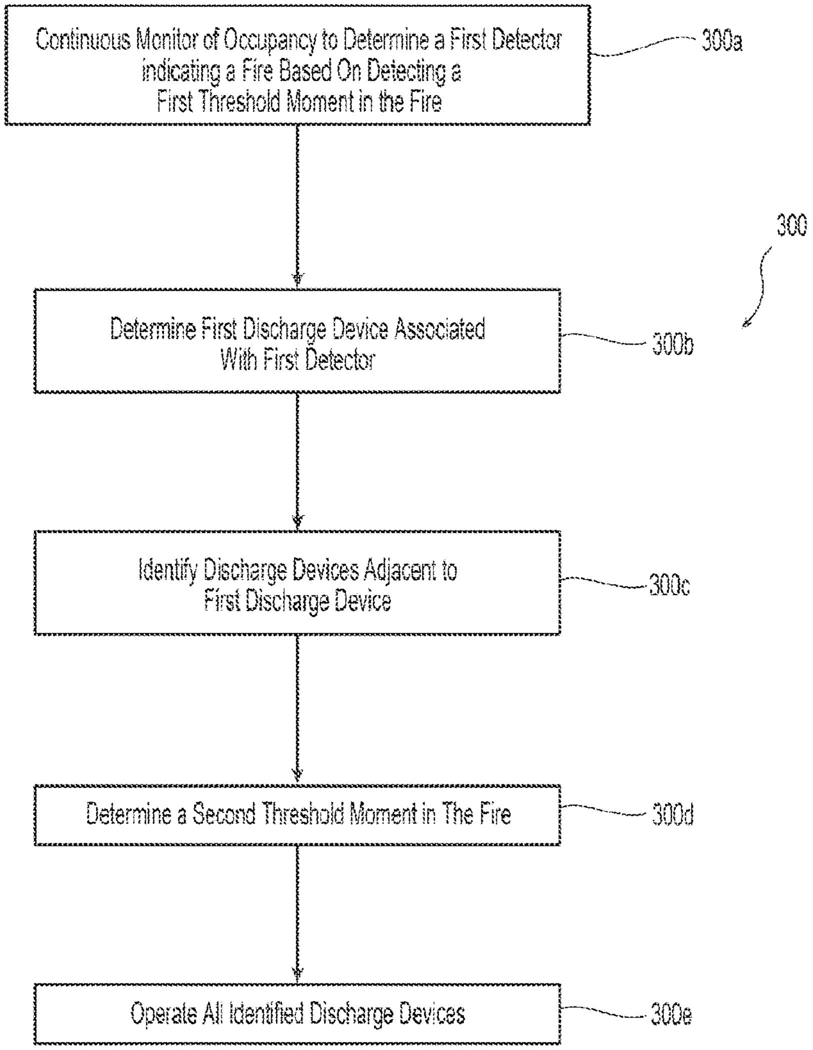
FIG. 4C is another preferred embodiment of controller operation of the system of FIG. 1.

Shown in FIG. 4C, is a flowchart showing another exemplary preferred operational embodiment 300 of the controller of the system 100. In a first step 300*a*, the controller 120 monitors the environment of the occupancy for the indication of a fire and preferably its location based upon sensed or detected input from the detectors 130 reading a value meeting or exceeding a first threshold moment in the fire. For example, one or more detectors 130 can return a reading meeting or exceeding a threshold rate of rise in temperature, a threshold temperature or other measured parameter. The controller 120 processes the data to preferably determine a first distribution device 110 closest to or associated with one or more detectors 130 from step 300*b* and more preferably closest to the determined location of the fire. The controller 120 in step 300*c* identifies a preferred discharge array to address the detected fire by identifying the distribution devices preferably immediately adjacent and more preferably surrounding the first distribution device 110 previously identified. Identification of adjacent distribution devices is preferably, based upon controller 120 programming providing an address or location of each device which can be related to identified adjacency or relative positioning between devices. Moreover, the number of devices in the preferred array can be a user-defined or preprogrammed number. The controller 120 then determines in step 300*d* a second threshold moment in the fire preferably using the same parameters or criteria used in the determination of the first detection of step 300*a* or by a preferably higher threshold. The second threshold can be defined by readings returned from one or more detectors 130. With the second threshold moment detected, the controller 120 then operates all identified devices 110 of the preferred array to address the detected fire in a preferred step 300*e*.

With reference again to FIG. 5A for example, if detector 130*k* and associated distribution device 110*k* are first identified under the methodology at a first threshold, the immediately adjacent and surrounding eight distribution devices, 110*f,* 110*g*, 110*h*, 110*j*, 110*l*, 110*n*, 110*o* and 110*p* can be automatically identified for selection of a preferred discharge array. Following a determination of a second threshold moment in the fire, detected for example by the first detector 130*k* at a second preferably higher threshold value than the first, the preferred array can be operated by the controller for discharge to address and preferably quench the detected fire. Alternatively, the second threshold moment can be detected by a second detector 130*g*, for example, reading at the same or higher threshold than the first detector 130*k*. For such a preferred embodiment, the identification of adjacent and surrounding devices is preferably independent of temperature detection or other measured thermal parameter and instead based upon the preset location or preprogrammed addresses of the devices to determine adjacency or relative positioning.

Alternatively or additionally, where user defined parameters specify a smaller number of distribution devices 110 in the preferred discharge array, such as for example, four distribution devices, the identification of a second detector 130 can be used to determine how the preferred discharge array is to be located or centered. Again with reference to FIG. 5A, if detector 130*k* and associated distribution device 110*k* are first identified under a first threshold, the immediately adjacent and surrounding eight distribution devices, 110*f,* 110*g*, 110*h*, 110*j*, 110*l*, 110*n*, 110*o* and 110*p* can be identified for possible selection of a preferred discharge array. If at a second user-defined or pre-programmed threshold, detector 130*f* is identified, the controller can fixedly identify the four fluid distribution devices 110*f,* 110*g*, 110*j* and 110*k* as the preferred four-device discharge array for controlled operation. Accordingly, in one aspect, this methodology can provide for a preferred user-defined preset, fixed or preprogrammed actuation of a group or zone of distribution devices 110 upon thermal detection identifying a first distribution device.

Figure 4D:
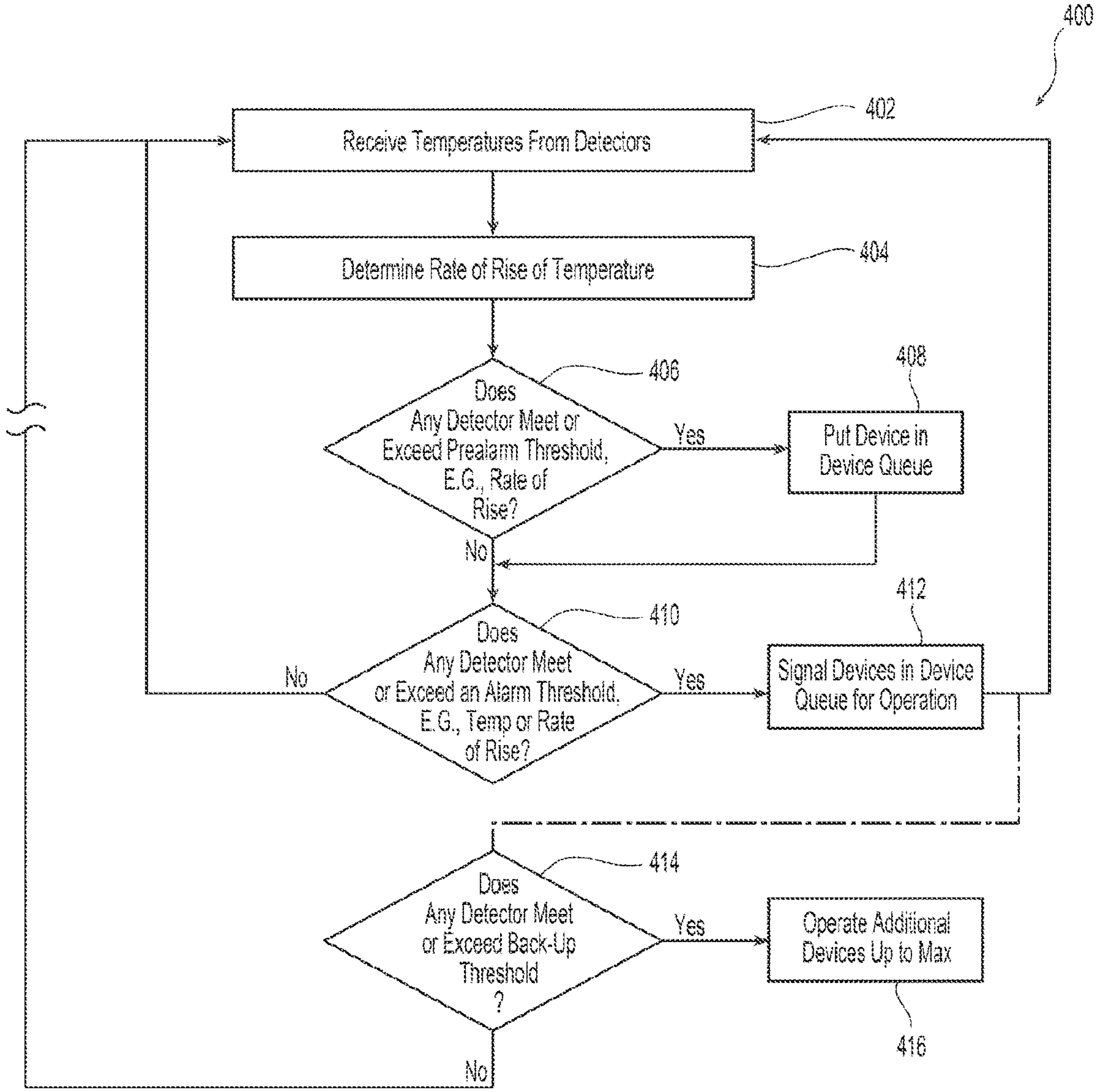
FIG. 4D is another preferred embodiment of controller operation of the system of FIG. 1.

Shown in FIG. 4D are alternate embodiments of another methodology for use in the system 100. This embodiment of the methodology dynamically identifies and operates an array of fluid distribution devices 110 above and about and more preferably centered about and surrounding the point of fire origin based on the monitoring and detection of a fire at each detector 130. Each detector 130 is preferably associated with a single discharge device 110. The methodology employs two different detector sensitivity thresholds in which one is a more sensitive or lower threshold than the other. The lower threshold defines a preferred pre-alarm threshold to identify a preferred number of distribution devices above and about the detected fire for a controlled operation. The lesser sensitive or higher threshold identifies the moment of actuation of the identified group of fluid distribution devices.

In the embodiment of the system and methods, the controller 120 is programed to define a preferred pre-alarm threshold and a preferred higher alarm threshold. The thresholds can be one or more combination of rate of rise, temperature or any other detected parameter of the detectors 130. The controller 120 is further preferably programmed with a minimum number of distribution devices to be identified in the preferred discharge array. A device queue is preferably defined as being composed of those distribution devices associated with a detector that has met or exceeded the pre-alarm threshold. The programmed minimum number of devices 110 defines the minimum number of devices required to be in the queue before the array is actuated or operated by the controller 120 at the programmed alarm threshold. The controller 120 is further preferably programmed with a maximum number of distribution devices 110 in the device queue to limit the number of devices to be operated by the controller 120.

In an exemplary embodiment of the programmed controller 120 for the protection of double-row rack exposed expanded plastics up to forty feet (40 ft.) beneath a forty-five foot (45 ft.) ceiling, the pre-alarm threshold can be set to 20° F. per minute rate of rise with an alarm threshold at 135° F. and the minimum and maximum number of devices being four and six (4/6) respectively. In the exemplary embodiment of the methodology 400 shown in FIG. 4D, at step 402 the controller 120 receives temperature formation from the detectors 130. In step 404, the controller 120 looks at the historic temperature information from each of these detectors 130 and the current temperature detected by each of the detectors 130 to determine a rate of rise of the temperature at each of these detectors. In step 406, it is determined whether or not the rate of rise of any detector 130 is greater than the pre-alarm threshold rate of rise. If it is determined that a detector meets or exceeds the pre-alarm threshold, then the distribution device 110 associated with the detector 130 is placed in the device queue at step 408. At step 410, the detectors 130 continue to monitor the occupancy to detect a rate of rise equal to or exceeding the alarm threshold. If the alarm threshold is met or exceeded and the number of distribution devices 110 in the device queue is equal to or exceeds the minimum number of devices up to the maximum number of distribution devices in the device queue, the devices in the queue are signaled for operation at step 412. Again, the controller 120 can limit or control the total number of device operations up to the maximum identified in the program of the controller 120.

With reference to FIG. 5A and an exemplary fixe event F, the detectors 130 monitor the storage occupancy. Where for example, eight detectors 130 detect the temperature and/or rate of rise exceeding the programmed pre-alarm threshold, the queue of devices is built sequentially up to a maximum of six distribution devices 110 with each device being associated with one of the eight detectors 130. The distribution devices 110 in the queue can include, for example, 110*b*, 110*c*, 110*f*, 110*g*, 110*j*, 110*k*. Once the alarm threshold is equal or exceeded, the six devices 110 defining the device queue can be operated and more preferably simultaneously operated to address the fire F.

The controller 120 can be additionally or optionally programmed with a backup threshold, which is a detected or derived parameter which can be the same as or different from the pre-alarm and alarm threshold to define a condition or moment at which additional devices for controlled operation after the device queue has been actuated. An exemplary backup threshold for the previously described protection system can be 175° F. Additionally, the controller can be programmed with a preferred maximum number of additional distribution devices 110, such as for example three (3) devices to be operated following operation of the initial device queue for a total of nine devices. Optionally shown in FIG. 4D of the method of operation 400 and after the operation of the queue of distribution devices 110, additional devices up to the maximum number of additional can be identified and operated in respective steps 414, 416 for controlled operation if the detectors 130 detect directly or indirectly a value that equals or exceeds the backup threshold. Accordingly, where the program is programmed with the maximum distribution devices of six (6) to define the device queue and three (3) maximum additional devices a total of eight device may be operated by the controller 120 when the detectors 130 continue to detect fire parameters equal or exceeding the backup threshold. For example, devices, 110*a*, 110*e*, 1100*i* are actuated if their associated detectors 130 meet or exceed the backup threshold.

Figure 4E:
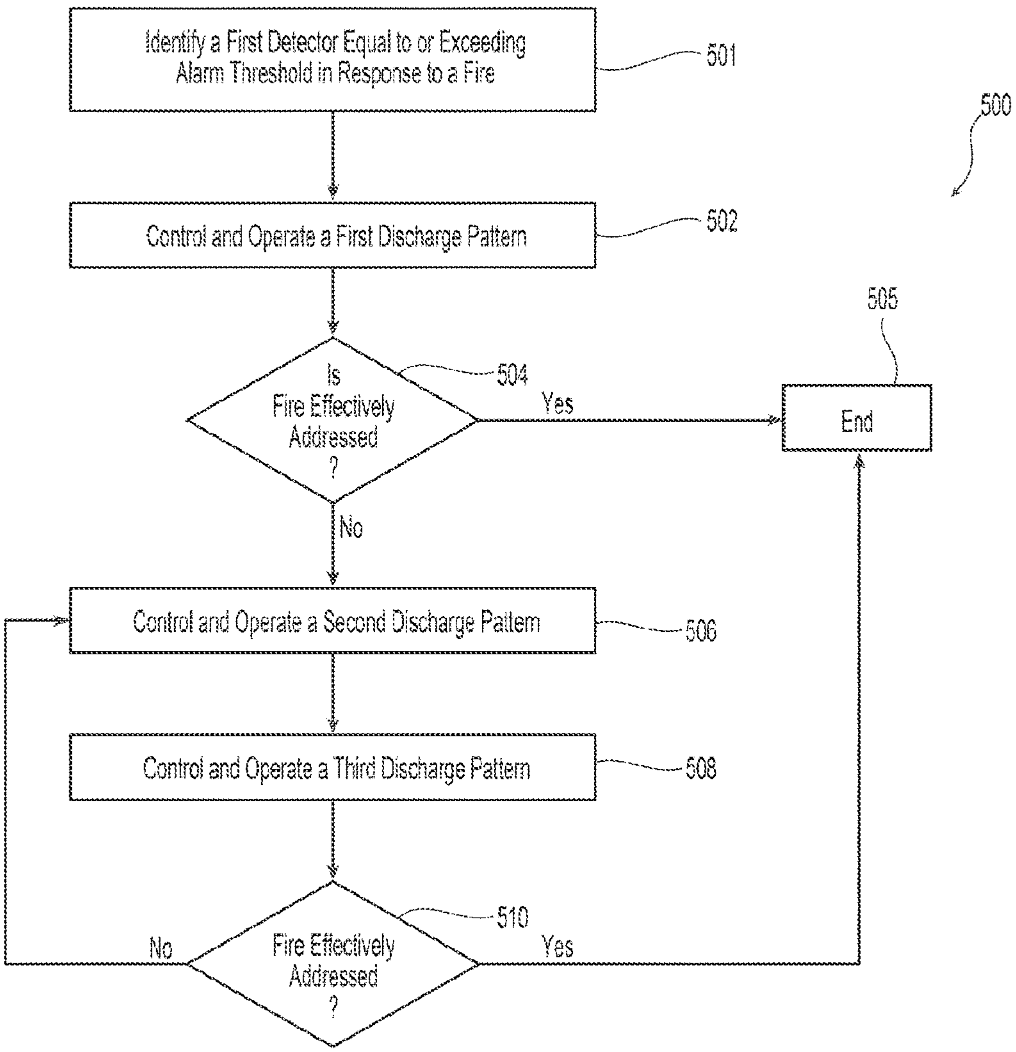
FIG. 4E is another preferred embodiment of controller operation of the system of FIG. 1.

Shown in FIG. 4E is another embodiment of a methodology 500 of operation of the controller 120 in the system 100. This embodiment of the methodology continuously monitors the condition of the fire and as needed, address the fire with a desired fixed group of fluid distribution devices that preferably addresses the fire and minimizes the volume of discharge. Operation of the fluid distribution devices of the methodology 500 can be controlled by the controller 120 and more preferably, the fluid distribution devices are preferably configured for fluid control in which the controller 120 can cease and reinitiate discharge and more preferably control flow from the fluid distribution devices 110.

In preferred first step 501, a first detector 130 is preferably identified by the controller 120 in response to detection reading equal to or exceeding a programmed alarm threshold condition, such as for example, a threshold temperature, rate of rise or other detected parameter. In step 502, one or more fluid distribution devices 110 is operated preferably based upon a programmed association or programmed proximity to the identified first detector 130. A detector 130 can be associated with a fluid distribution device on a one-to-one basis or alternatively can be associated with more than one fluid distribution device, such as for example, a group of four distribution devices 110 surrounding and centered about a single detector 130. With reference to FIGS. 4E and 5A, in one preferred embodiment of the methodology and step 502, the controlled fluid distribution devices preferably includes the combination of a single primary distribution device 110*g* associated with the identified first detector 130*g* and eight secondary distribution devices 110*b*, 110*c*, 110*d*, 110*f*, 110*h*, 110*j*, 110*k*, 110*l* centered about the primary distribution device 110*g*. The primary and secondary devices 110 are activated to define a first discharge patter for a period of operation, such as for example, two minutes in step 502.

Following the first discharge pattern period, a determination is made at step 504 whether or not the fire has been suppressed, controlled or otherwise effectively addressed. The detectors 130 and controller 120 of the system continue to monitor the occupancy to make the determination. If it is determined that the fire has been effectively addressed and more preferably quenched, then all of the fluid distribution devices 110 can be deactivated and the method 500 is terminated. However, if it is determined that the fire has not been effectively addressed, then the fluid distribution devices 110 are again activated in the same first discharge pattern or more preferably a different second discharge pattern at step 506 to continue to target the fire with firefighting fluid. The fluid distribution devices 110 defining the second pattern are maintained open by the controller 120 for a programmed period of, for example, thirty seconds (30 sec.). The total amount of water that is used to address the fire is preferably minimized. Accordingly, in one preferred embodiment, the second discharge pattern is preferably defined by four secondary 110*c*, 110*f*, 110*h*, 110*k* centered about the primary distribution device 110*g*. Additionally or alternatively, the second discharge pattern can vary from the first discharge pattern by altering the flow of firefighting fluid from one or more distribution devices 110 or the period of discharge to provide for the preferred minimized fluid flow.

In a preferred step 508, the controller again preferably alters the secondary distribution devices 110 about the primary distribution device to define a third discharge pattern. For example, secondary distribution devices 110*b,* 110*d,* 110*j,* 110*l* are operated to define the third discharge pattern. The third pattern is discharge for a thirty seconds (30 sec.) or other programmed period of discharge. The preferred sequential activation of second and third discharge patterns facilitate formation and maintenance of a perimeter of fluid distribution devices 110 preferably above and about the fire, while minimizing water usage and thus, minimizing potential water damage on the other. Following steps 506 and 508, it is again determined if the fire is effectively addressed in step 510. If the fire effectively addressed and more preferably quenched, then all of the discharge devices are deactivated in step 505. However, if it is determined that the fit is not effectively addressed the controller repeats steps 506 through 508 to continue to discharge firefighting fluid in the sequential second and third patterns previously described.

For the preferred ceiling-only fire protection systems, the ability to effectively address and more particularly quench a fire can depend upon the storage occupancy and the configuration of the stored commodity being protected. Parameters of the occupancy and storage commodity impacting the system installation and performance can include, ceiling height H1 of the storage occupancy 10, height of the commodity 12, classification of the commodity 12 and the storage arrangement and height of the commodity 12 to be protected. Accordingly, the preferred means for quenching in a ceiling-only system can detect and locate a fire for operation of the preferred number and pattern of fluid distribution devices defining a preferred discharge array to address and more preferably quench a fire at a maximum ceiling and storage height of a commodity of a maximum hazard commodity classification including up to exposed expanded Group A plastics.

Referring to FIG. 1, the ceiling C of the occupancy 10 can be of any configuration including any one of: a flat ceiling, horizontal ceiling, sloped ceiling or combinations thereof. The ceiling height H1 is preferably defined by the distance between the floor of the storage occupancy 10 and the underside of the ceiling C above (or roof deck) within the storage area to be protected, and more preferably defines the maximum height between the floor and the underside of the ceiling C above (or roof deck). The commodity array 12 can be characterized by one or more of the parameters provided and defined in Section 3.9.1 of NFPA-13. The array 12 can be stored to a storage height H2, in which the storage height H2 preferably defines the maximum height of the storage and a nominal ceiling-to-storage clearance CL between the ceiling and the top of the highest stored commodity. The ceiling height H1 can be twenty feet or greater, and can be thirty feet or greater, for example, up to a nominal forty-five feet (45 ft.) or higher such as for example up to a nominal fifty feet (50 ft.), fifty-five (55 ft.), sixty feet (60 ft.) or even greater and in particular up to sixty-five feet (65 ft.) Accordingly, the storage height H2 can be twelve feet or greater and can be nominally twenty feet or greater, such as for example, a nominal twenty-five feet (25 ft.) up to a nominal sixty feet or greater, preferably ranging nominally from between twenty feet and sixty feet. For example, the storage height can be up to a maximum nominal storage height H2 of forty-five feet (45 ft.), fifty feet (50 ft.), fifty-five (55 ft.), or sixty feet (60 ft.). Additionally or alternatively, the storage height H2 can be maximized beneath the ceiling C to preferably define a minimum nominal ceiling-to-storage clearance CL of any one of one foot, two feet, three feet, four feet, or five feet or anywhere in between.

The stored commodity array 12 preferably defines a high-piled storage (in excess of twelve feet (12 ft.)) rack arrangement, such as for example, a single-row rack arrangement, preferably a row rack storage arrangement; and even more preferably a double-row rack storage arrangement. Other high-piled storage configurations can be protected by the system 100, including non-rack storage arrangements including for example: palletized, solid-piled (stacked commodities), bin box (storage in five sided boxes with little to no space between boxes), shelf (storage on structures up to and including thirty inches deep and separated by aisles of at least thirty inches wide) or back-to-back shelf storage (two shelves separated by a vertical barrier with no longitudinal flue space and maximum storage height of fifteen feet). The storage area can also include additional storage of the same or different commodity spaced at an aisle width W in the same or different configuration. More preferably, the array 12 can includes a main array 12*a* and one or more target arrays 12*b,* each defining an aisle width W1, W2 to the main array, as seen in FIGS. 5A and 5B.

The stored commodity 12 can carp include any one of NFPA-13 defined Class I, II, III or IV commodities, alternatively Group A, Group B, or Group C plastics, elastomers, and rubbers, or further in the alternative any type of commodity capable of having its combustion behavior characterized. With regard to the protection of Group A plastics, the preferred embodiments of the systems and methods can be configured for the protection of expanded and exposed plastics. According to NFPA 13, Sec. 3.9.1.13, "Expanded (Foamed or Cellular) Plastics" is defined as "[t]hose plastics, the density of which is reduced by the presence of numerous small cavities (cells), interconnecting or not, disposed throughout the mass." Section 3.9.1.14 of NFPA 13 defines "Exposed Group A Plastic Commodities" as "[t]hose plastics not in packaging or coverings that absorb water or otherwise appreciably retard the burning hazard."

By responding and more particularly quenching a fire in storage commodity in a manner as described herein, the preferred systems 100 provide for a level of fire protection performance that significantly limits and more preferably reduces the impact of the fire on the storage commodity. This is believed to provide less damage to the stored commodity as compared to previously known fire protection performances, such as for example, suppression or fire control. Moreover, in the protection of exposed expanded plastic commodities the preferred systems and methods provide for ceiling only-protection at heights and arrangements not available under the current installation standards. Additionally or alternatively, the preferred systems and methods provide for ceiling only-protection of a exposed expanded plastic commodities without accommodations such as for example, a vertical or horizontal barriers. As described herein, actual fire testing can be conducted to demonstrate the preferred quenching performance of the preferred systems and methods described herein.

Figure 5B:
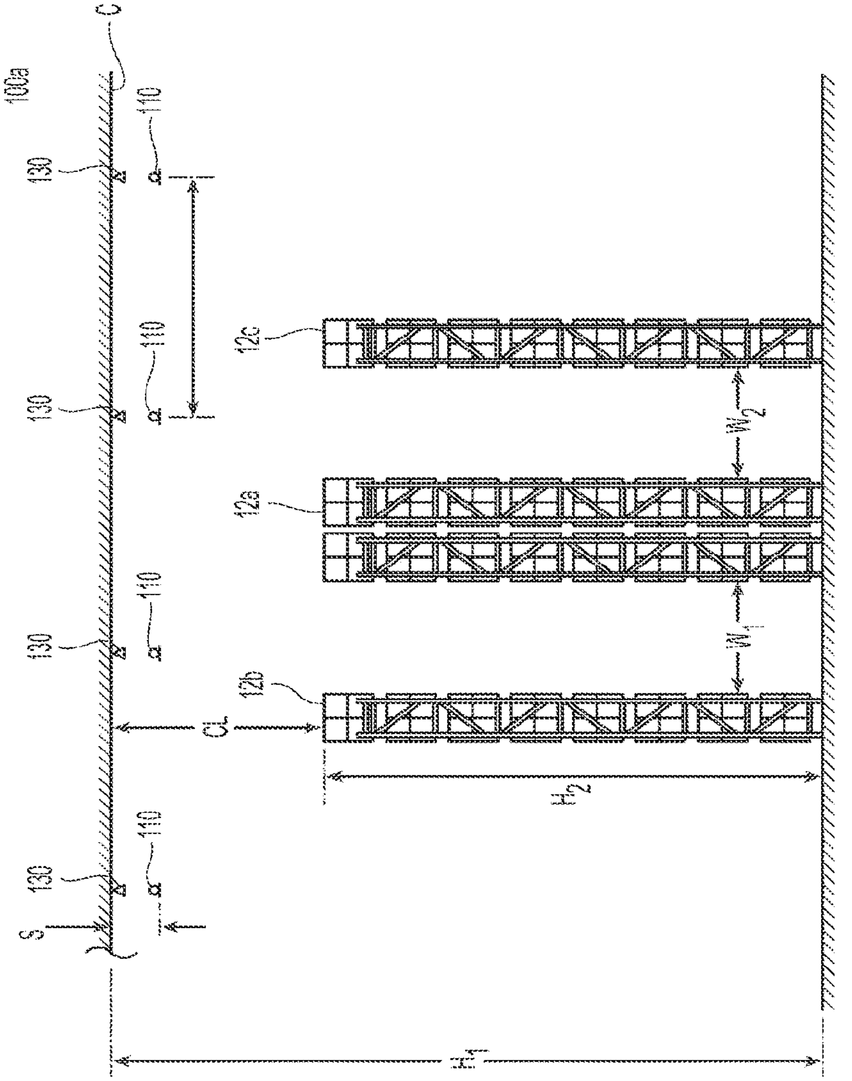

In the preferred ceiling-only arrangement of the preferred system 100, the fluid distribution devices 110 are installed between the ceiling C and a plane defined by the storage commodity as schematically shown in FIGS. 1, 5A and 5B. The fluid distribution subsystem 100*a* includes a network of pipes 150 having a portion suspended beneath the ceiling of the occupancy and above the commodity to be protected. In the preferred embodiments of the system 100, the plurality of fluid distribution devices 110 are mounted or connected to the network of pipes 150 to provide for the ceiling-only protection. The network of pipes 150 preferably includes one or more main pipes 150*a* from which one or more branch lines 150*b*, 150*c*, 150*d* extend. The distribution devices 110 are preferably mounted to and spaced along the spaced-apart branch pipes 150*b*, 150*c*, 150*d* to form a desired device-to-device spacing a×b. Preferably disposed above and more preferably axially aligned with each distribution device 110 is a detector 130. The distribution devices 110, branch lines and main pipe(s) can be arranged so as to define either one of a gridded network or a tree network. The network of pipes can further include pipe fittings such as connectors, elbows and risers, etc. to interconnect the fluid distribution portion of the system 100 and the fluid distribution devices 110.

The network of pipes 150 connect the fluid distribution devices 110 to a supply of firefighting liquid such as, for example, a water main 150*e* or water tank. The fluid distribution sub-system can further include additional devices (not shown) such as, for example, fire pumps, or backflow preventers to deliver the water to the distribution devices 110 at a desired flow rate and/or pressure. The fluid distribution sub-system further preferably includes a riser pipe 150*f* which preferably extends from the fluid supply 150*e* to the pipe mains 150*a*. The riser 150*f* can include additional components or assemblies to direct, detect, measure, or control fluid flow through the water distribution sub-system 110*a*. For example, the system can include a check valve to prevent fluid flow from the sprinklers back toward the fluid source. The system can also include a flow meter for measuring the flow through the riser 150*f* and the system 100. Moreover, the fluid distribution sub-system and the riser 150*f* can include a fluid control valve, such as for example, a differential fluid-type fluid control valve. The fluid distribution subsystem 100*a* of system 100 is preferably configured as a wet pipe system (fluid discharges immediately upon device operation) or a variation thereof including, non-interlocked, single or double-interlock preaction systems (the system piping is initially filled with gas and then filled with the firefighting fluid in response to signaling from the detection subsystem such that fluid discharges from the distribution devices at its working pressure upon device operation).

A preferred embodiment of the fluid distribution device 110 includes a fluid deflecting member coupled to a frame body as schematically shown in FIGS. 2A and 2B. The frame body includes an inlet for connection to the piping network and an outlet with an internal passageway extending between the inlet and the outlet. The deflecting member is preferably axially spaced from the outlet in a fixed spaced relation. Water or other firefighting fluid delivered to the inlet is discharged from the outlet to impact the deflecting member. The deflecting member distributes the firefighting fluid to deliver a volumetric flow which contributes to the preferred collective volumetric flow to address and more preferably quench a fire. Alternatively, the deflecting member can translate with respect to the outlet provided it distribute the firefighting fluid in a desired manner upon operation. In the ceiling-only systems described herein, the fluid distribution device 110 can be installed such that its deflecting member is preferably located from the ceiling at a desired deflector-to-ceiling distance S as schematically shown in FIG. 5B. Alternatively, the device 110 can be installed at any distance from the ceiling C provided the installation locates the device above the commodity being protected in a ceiling-only configuration.

Accordingly, the fluid distribution device 110 can be structurally embodied with a frame body and deflector member of a "fire protection sprinkler" as understood in the art and appropriate configured or modified for controlled actuation as described herein. This configuration can include the frame and deflector of known fire protection sprinklers with modifications described herein. The sprinkler frame and deflectors components for use in the preferred systems and methods can include the components of known sprinklers that have been tested and found by industry accepted organizations to be acceptable for a specified sprinkler performance, such as for example, standard spray, suppression, or extended coverage and equivalents thereof. For example, a preferred fluid distribution device 110 for installation in the system 100 includes the frame body and deflector member shown and described in technical data sheet "TFP312: Model ESFR-25 Early Suppression, Fast Response Pendent Sprinklers 25.2 K-factor" (November 2012) from TYCO FIRE PRODUCTS, LP having a nominal 25.2 K-factor and configured for electrically controlled operation.

As used herein, the K-factor is defined as a constant representing the sprinkler discharge coefficient, that is quantified by the flow of fluid in gallons per minute (GPM) from the sprinkler outlet divided by the square root of the pressure of the flow of fluid fed into the inlet of the sprinkler passageway in pounds per square inch (PSI). The K-factor is expressed as GPM/(PSI)$^{1/2}$. NFPA 13 provides for a rated or nominal K-factor or rated discharge coefficient of a sprinkler as a mean value over a K-factor range. For example, for a K-factor 14 or greater, NFPA 13 provides the following nominal K-factors (with the K-factor range shown in parenthesis): (i) 14.0 (13.5-14.5) GPM/(PSI)$^{1/2}$; (ii) 16.8 (16.0-17.6) GPM/(PSI)$^{1/2}$; (iii) 19.6 (18.6-20.6) GPM/(PSI)$^{1/2}$; (iv) 22.4 (21.3-23.5) GPM/(PSI)$^{1/2}$; (v) 25.2 (23.9-26.5) GPM/(PSI)$^{1/2}$; and (vi) 28.0 (26.6-29.4) GPM/(PSI)$^{1/2}$; or a nominal K-factor of 33.6 GPM/(PSI)$^{1/2}$ which ranges from about (31.8-34.8 GPM(PSI)$^{1/2}$). Alternate embodiments of the fluid distribution device 110 can include sprinklers having the aforementioned nominal K-factors or greater.

U.S. Pat. No. 8,176,988 shows another exemplary fire protection sprinkler structure for use in the systems described herein. Specifically shown and described in U.S. Pat. No. 8,176,988 is an early suppression fast response sprinkler (ESFR) frame body and embodiments of deflecting member or deflector for use in the preferred systems and methods described herein. The sprinklers shown in U.S. Pat. No. 8,176,988 and technical data sheet TFP312 are a pendent-type sprinklers; however upright-type sprinklers can be configured or modified for use in the systems described herein. Alternate embodiments of the fluid distributing devices 110 for use in the system 100 can include nozzles, misting devices or any other devices configured for controlled operation to distribute a volumetric flow of firefighting fluid in a manner described herein.

The preferred distribution devices 110 of the system 100 can include a sealing assembly, as seen for example, in the sprinkler of U.S. Pat. No. 8,176,988 or other internal valve structure disposed and supported within the outlet to control the discharge from the distribution device 110. However, the operation of the fluid, distribution device 110 or sprinkler for discharge is not directly or primarily triggered or operated by a thermal or heat-activated response to a fire in the storage occupancy. Instead, the operation of the fluid distribution devices 110 is controlled by the preferred controller 120 of the system in a manner as described herein. More specifically, the fluid distribution devices 110 are coupled directly or indirectly with the controller 120 to control fluid discharge and distribution from the device 110. Shown in FIGS. 2A and 2B are schematic representations of preferred electro-mechanical coupling arrangements between a distribution device assembly 110 and the controller 120 technical data sheet TFP312. Shown in FIG. 2A is a fluid distribution device assembly 110 that includes a sprinkler frame body 110*x* having an internal sealing assembly supported in place by a removable structure, such as for example, a thermally responsive glass bulb trigger. A transducer and preferably electrically operated actuator 110*y* is arranged, coupled, or assembled, internally or externally, with the sprinkler 110*x* for displacing the support structure by fracturing, rupturing, ejecting, and/or otherwise removing the support structure and its support of the sealing assembly to permit fluid discharge from the sprinkler. The actuator 110*y* is preferably electrically coupled to the controller 120 in which the controller provides, directly or indirectly, an electrical pulse or signal for signaled operation of the actuator to displace the support stricture and the sealing assembly for controlled discharge of firefighting fluid from the sprinkler 110*x*.

Alternate or equivalent distribution device electro-mechanical arrangements for use in the system are shown in U.S. Pat. Nos. 3,811,511; 3,834,463 or 4,217,959. Shown and described in FIG. 2 of U.S. Pat. No. 3,811,511 is a sprinkler and electrically responsive explosive actuator arrangement in which a detonator is electrically operated to displace a slidable plunger to rupture a bulb supporting a valve closure in the sprinkler head. Shown and described in FIG. 1 of U.S. Pat. No. 3,834,463 is a sensitive sprinkler having an outlet orifice with a rupture disc valve upstream of the orifice. An electrically responsive explosive squib is provided with electrically conductive wires that can be coupled to the controller 120. Upon receipt of an appropriate signal, the squib explodes to generate an expanding as to rupture disc to open the sprinkler. Shown and described in FIG. 2 of U.S. Pat. No. 4,217,959 is an electrically controlled fluid dispenser for a fire extinguishing system in which the dispenser includes a valve disc supported by a frangible safety device to close the outlet orifice of the dispenser. A striking mechanism having an electrical lead is supported against the frangible safety device. The patent describes that an electrical pulse can be sent through the lead to release the striking mechanism and fracture the safety device thereby removing support for the valve disc to permit extinguishment to flow from the dispenser.

Shown in FIG. 2B, is another preferred electro-mechanical arrangement for controlled actuation that includes an electrically operated solenoid valve 110*z* in line and upstream from an open sprinkler or other frame body 110*x* to control the discharge from the device frame. With no seal assembly in the frame outlet, water is permitted to flow from the open sprinkler frame body 110*x* upon the solenoid valve 110*z* receiving an appropriately configured electrical signal from the controller 120 to open the solenoid valve depending upon whether the solenoid valve is normally closed or normally open. The valve 110*z* is preferably located relative to the frame body 110*x* such that there is negligible delay in delivering fluid to the frame inlet at its working pressure upon opening the valve 110*z*. Exemplary known electrically operated so aid valves for use in the system 100 can include the electric solenoid valve and equivalents thereof described in. ASCO® technical data sheet "⅔ Series 8210: Pilot Operated General Service Solenoid Valves Brass or Stainless Steel Bodies ⅜ 2 ½ NPT" at <http://http://www.ascovalve.com/ Common/PDFFiles/Product/8210R6.pdf>. In one particular solenoid valve arrangement in which there is a one-to-one ratio of valve to frame body, the system can effectively provide for controlled micro-deluge systems to address and amore preferably quench a fire thereby further limiting and more preferably reducing damage to the occupancy and stored commodity as compared to known deluge arrangements.

A preferred system 100 as previously described was installed and subject to actual fire testing. A plurality of preferred fluid distribution devices 110 and detectors 130 were installed above rack storage of cartoned unexpanded Group A plastic stored to a normal storage height of forty feet (40 ft.) under a forty-five foot (45 ft.) horizontal ceiling to define a nominal clearance of five feet (5 ft.). More specifically, sixteen open sprinkler frame bodies and deflector members of an ESFR type sprinkler, each having a nominal K-factor of 25.2 GPM/PSI.$^{1/2}$, were arranged with a solenoid valve in a fluid distribution assembly, as shown for example in FIG. 2B, to define an effective K-factor of 19.2 GPM/PSI.$^{1/2}$ Disposed above and about each fluid distribution assembly were a pair of detectors 130. The distribution devices 110 were installed on 10 ft.×10 ft. spacing and supplied with water so as to provide a flow from each sprinkler that is equivalent to a nominal K-factor of 25 GPM/PSI.$^{1/2}$ supplied with an operating pressure of water at 35 psi. The assemblies were installed beneath the ceiling so as to locate the deflector member of the sprinkler twenty inches (20 in.) beneath the ceiling.

The sprinkler assemblies were installed above Group A Plastic commodity that included single wall corrugated cardboard cartons measuring 21 in.×21 in. containing 125 crystalline polystyrene empty 16 ox. cups in separated compartments within the carton. Each pallet of commodity was supported by a two-way 42 in.×42 in.×5 in. slatted deck hardwood pallet. The commodity was stored in a rack arrangement having a central double-row rack with two single-row target arrays disposed about the central rack to define four foot (4 ft.) wide aisles widths W1, W2, as seen in FIG. 5B, between the central array and the target arrays. The central double-row rack array includes 40 ft. high by 36-inch wide rack members arranged with four 96 inch bays, eight tiers each row, and nominal 6 inch longitudinal and transverse flue spaces throughout the test array.

The geometric center of the central rack was centered below four fluid distribution assemblies 110. Two half-standard cellulose cotton igniters were constructed from 3 in.×3 in. long cellulosic bundle soaked with four ounces (4 oz.) gasoline and wrapped in a polyethylene bag. The igniters were positioned at the floor and offset 21 inches from the center of the central double row rack main array. The igniters were ignited to provide a single fire F test of the system 100. The system 100 and a preferred methodology located the test fire and identified the fluid distribution devices 110 for addressing the fire in a manner as previously described. The system 100 continued to address the test fire for a period of thirty-two minutes; and at the conclusion of the test, the commodity was evaluated.

The test fire illustrates the ability of a preferred system configured for quenching to substantially reduce the impact of the fire on the stored commodity. A total of nine distribution devices were identified for operation and operated within two minutes of ignition. Included among the nine identified devices are the four distribution devices 110*q*, 110*r*, 110*s*, 110*t* immediately above and about the fire F. The four operated devices 110*q*, 110*r*, 110*s*, 110*t* defined a discharge array that effectively quenched the ignition by limiting propagation of the fire in the vertical direction toward the ceiling, in the fore and aft directions toward the ends of the central array 12*a*, and in the lateral direction toward the target arrays 12*b*, 12*c*, Thus, the fire was confined or surrounded by the four most immediate or closest fluid distribution devices 110*q*, 110*r*, 110*s*, 110*t* above and about the fire.

Figure 6A:
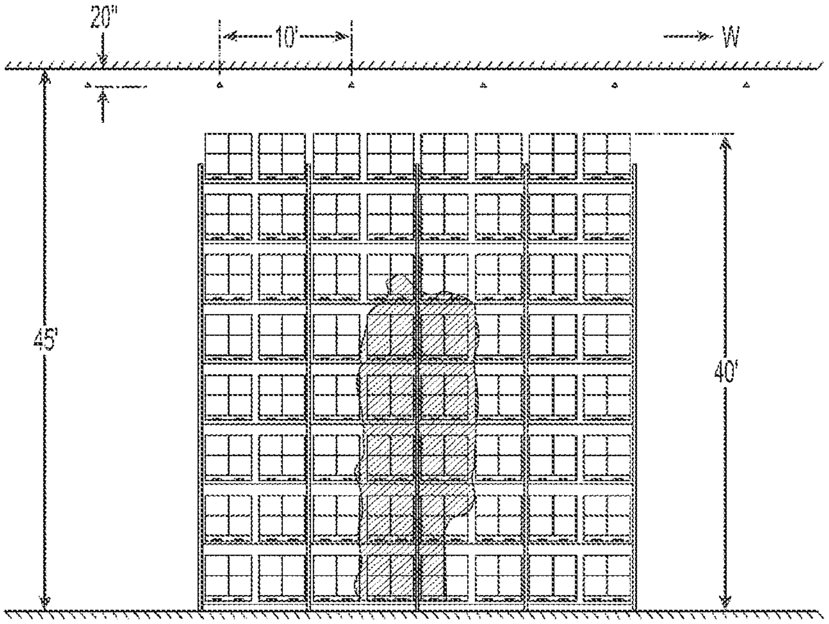
FIGS. 6A and 6B are graphic illustrations of damage to a stored commodity from a test fire addressed by another embodiment of the preferred system.
Figure 6B:
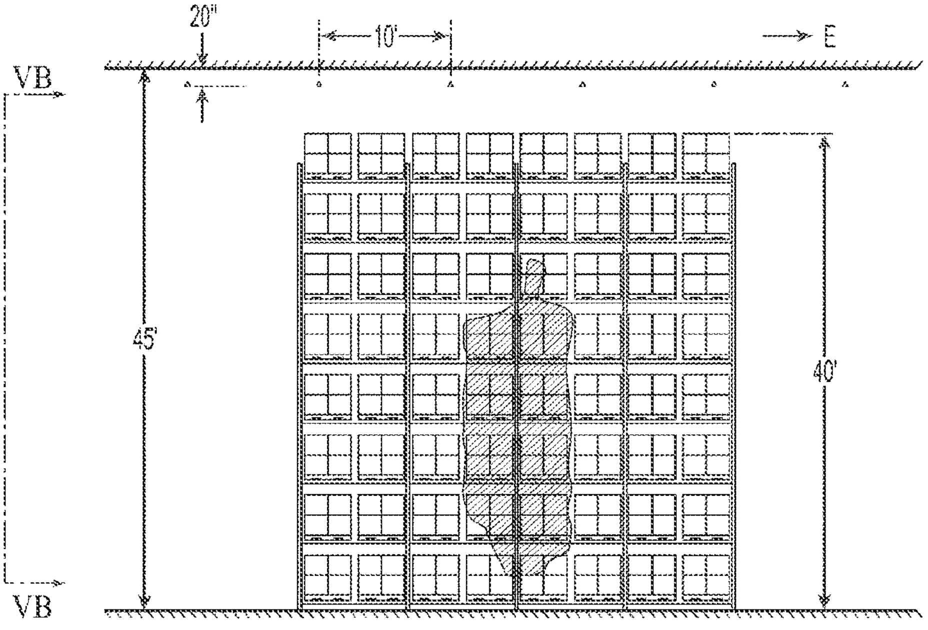

The damage o the main array is graphically shown in FIGS. 5B, 6A and 6B. Damage to the commodity was focused to the central core of the central array as defined by the centrally disposed pallets indicated in shading. In the direction toward the ends of the array, the fire damage was limited to the two central bays. It was observed that the damage to the cartons was minimized. Accordingly, in one preferred aspect, the quenching system confined the fire within a cross-sectional area defined by the preferred four fluid distribution devices most closely disposed above and about the fire. With reference to FIGS. 6A and 6B, the fire damage was also vertically limited or contained by the preferred quenching system. More specifically, the fire damage was limited vertically so as to extend from the bottom of the array to no higher than the sixth tier from the bottom of the stored commodity. Given that quenching performance confines the propagation of the fire, quenching performance can be further characterized by the ability of the preferred system to prevent the test fire from jumping across the aisles to the target arrays 12*b*, 12*c*.

Quenching performance can be observed by the satisfaction of one or more parameters or a combination thereof. For example, vertical damage can be limited to six or fewer tiers of commodity. Alternatively or additionally, vertical damage can be limited to 75% or less than the total a number of tiers of the test commodity. Lateral damage can also be quantified to characterize quenching performance. For example, lateral damage subject to quenching performance can be limited to no more than two pallets and is more preferably no more than one pallet in the direction toward the ends of the array.

Additional fire testing has shown that the preferred systems and methods described herein can be used in the ceiling-only protection of exposed expanded plastic commodities at heights and arrangements not available under the current installation standards. For example in one preferred system installation, a plurality of preferred fluid distribution devices 110 and detectors 130 can be installed above rack storage of exposed expanded Group A plastic stored to a nominal storage height ranging from twenty-five (25 ft.) to forty feet (40 ft.) under a forty-five foot (45 ft.) horizontal ceiling to define a nominal clearance ranging from five feet (5 ft.) to twenty feet (20 ft.). Provided the ceiling f a sufficient height, preferred embodiments of the systems and methodologies herein can protect up to a maximum fifty to fifty-five feet (50-55 ft.). In one preferred storage arrangement, wherein the ceiling height is forty-eight (48 ft.) and the nominal storage height is forty-three feet (43 ft.).

In one particular embodiment of the preferred system, a group of an ESFR type sprinkler frame bodies with internal sealing assembly and deflector member, each having a nominal K-factor of 25.2 GPM/PSI.$^{1/2}$, are preferably arranged with an electrically operated actuator in a fluid distribution assembly, as shown for example in FIG. 2A. Disposed above and about each fluid distribution assembly are a pair of detectors 130. The distribution devices 110 are preferably installed on 10 ft.×10 ft. spacing in a looped piping system and supplied with water at operating pressure of 60 psi. to provide a preferred. discharge density of 1.95 gpm/ft$^2$. The fluid distribution devices are preferably installed beneath the ceiling so as to locate the deflector member at a preferred deflector-to-ceiling distance S of eighteen inches (18 in.) beneath the ceiling. Each detector and fluid distribution device is coupled to a preferably centralized controller for detection of a fire and operation of one or more fluid distribution devices in a manner as described herein. The system and its controller 120 is preferably programmed to identify nine distribution devices 110 to define an initial discharge array for addressing a detected fire.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system, comprising:

a plurality of fluid distribution devices;

at least one detector that outputs an input signal indicative of a fire, each fluid distribution device of the plurality of fluid distribution devices associated with a corresponding detector of the at least one detector; and a controller comprising one or more processors to:

receive the input signal from the at least detector;

determine, based on the input signal, that a first threshold has been met or exceeded;

identify at least one fluid distribution device of the plurality of fluid distribution devices associated with the at least one detector for which the input signal is determined to indicate that the first threshold has been met or exceeded;

assign the identified at least one fluid distribution device to a queue, wherein the controller has a minimum number for fluid distribution devices to be assigned to the queue before actuation of the identified at least one fluid distribution device and has a maximum number of fluid distribution devices in the queue to limit fluid distribution devices to be operated by the controller;

determine, based on the input signal, that a second threshold has been met or exceeded, the second threshold higher than the first threshold; and actuate at least the minimum and up to the maximum number of fluid distribution devices assigned to the queue responsive to determining that the second threshold has been met or exceeded and that the minimum number of fluid distribution devices of the plurality of fluid distribution devices are assigned to the queue.

2. The system of claim 1, comprising:

the plurality of fluid distribution devices are coupled with one or more pipes below a ceiling of a building and above a storage commodity in the building, a height of the ceiling is greater than thirty feet.

3. The system of claim 1, comprising:

the at least one detector comprises a plurality of detectors, and each fluid distribution device of the plurality of fluid distribution devices is associated with a single detector of the plurality of detectors.

4. The system of claim 1, comprising:

the controller determines a location of the fire using the input signal.

5. The system of claim 1, comprising:

the first threshold and the second threshold correspond to at least one of a temperature and a rate of rise of temperature.

6. The system of claim 1, comprising:
the plurality of fluid distribution devices are in a ceiling-only arrangement.

7. The system of claim 1, comprising:
the at least one detector provides the input signal based on at least one of temperature, thermal energy, and spectral energy.

8. The system of claim 1, comprising:
the at least one detector is axially aligned with at one or more fluid distribution devices of the plurality of fluid distribution devices.

9. The system of claim 1, comprising:
the plurality of fluid distribution devices are positioned over a stored commodity comprising at least one of a Group A plastic, a Group B plastic, and a Group C plastic.

10. A method, comprising:
receiving, by one or more processors, an input signal indicative of a fire from at least detector; determining, by the one or more processors based on the input signal, that a first threshold has been met or exceeded;
identifying, by the one or more processors, at least one fluid distribution device of a plurality of fluid distribution devices associated with the input signal determined to indicate that the first threshold has been met or exceeded;
assigning, by the one or more processors, the identified at least one fluid distribution device to a queue, wherein a controller has a minimum number for fluid distribution devices to be assigned to the queue before actuation of the identified at least one fluid distribution device and has a maximum number of fluid distribution devices in the queue to limit fluid distribution devices to be operated by the one or more processors;
determining, by the one or more processors based on the input signal, that a second threshold has been met or exceeded, the second threshold higher than the first threshold;
and actuating, by the one or more processors, at least the minimum and up to the maximum number of fluid distribution devices assigned to the queue responsive to determining that the second threshold has been met or exceeded and that a minimum number of fluid distribution devices of the plurality of fluid distribution devices are assigned to the queue.

11. The method of claim 10, comprising:
the plurality of fluid distribution devices are coupled with one or more pipes below a ceiling of a building and above a stored commodity in the building, a height of the ceiling is greater than thirty feet.

12. The method of claim 10, comprising:
each fluid distribution device of the plurality of fluid distribution devices is associated with a particular detector of a plurality of detectors, each detector of the plurality of detectors providing the input signal.

13. The method of claim 10, comprising:
determining, by the one or more processors, a location of the fire using the input signal.

14. The method of claim 10, comprising:
the first threshold and the second threshold correspond to at least one of a temperature and a rate of rise of temperature.

15. The method of claim 10, comprising:
the plurality of fluid distribution devices are in a ceiling-only arrangement.

16. The method of claim 10, comprising:
receiving, by the one or more processors, the input signal based on at least one of temperature, thermal energy, and spectral energy.

17. The method of claim 10, comprising:
receiving, by the one or more processors, the input signal from at least one detector that is axially aligned with one or more fluid distribution devices of the plurality of fluid distribution devices.

18. The method of claim 10, comprising:
the plurality of fluid distribution devices are positioned over a stored commodity comprising at least one of a Group A plastic, a Group B plastic, and a Group C plastic.

* * * * *